US012475028B2

(12) United States Patent
Tarasenko et al.

(10) Patent No.: US 12,475,028 B2
(45) Date of Patent: Nov. 18, 2025

(54) SYSTEM AND METHOD FOR A TEST AUTOMATION FRAMEWORK ASSOCIATED WITH A SELF-DESCRIBING DATA SYSTEM

(71) Applicant: ARAS CORPORATION, Andover, MA (US)

(72) Inventors: Alexander Tarasenko, Andover, MA (US); William Turner, Andover, MA (US); Andrey Bondarenko, Andover, MA (US); Nicholas Simerov, Andover, MA (US); Pavel Zhuravlevich, Andover, MA (US)

(73) Assignee: Aras Corporation, Andover, MA (US)

( * ) Notice: Subject to any disclaimer, the term of this patent is extended or adjusted under 35 U.S.C. 154(b) by 0 days.

(21) Appl. No.: 17/965,585

(22) Filed: Oct. 13, 2022

(65) Prior Publication Data

US 2023/0120416 A1    Apr. 20, 2023

Related U.S. Application Data

(60) Provisional application No. 63/256,400, filed on Oct. 15, 2021.

(51) Int. Cl.
*G06F 8/61*    (2018.01)
*G06F 8/65*    (2018.01)
(Continued)

(52) U.S. Cl.
CPC ........ *G06F 11/3698* (2025.01); *G06F 11/368* (2013.01); *G06F 11/3692* (2013.01);
(Continued)

(58) Field of Classification Search
CPC ............... G06F 11/3664; G06F 11/368; G06F 11/3692; G06F 11/3688; G06F 11/3684;
(Continued)

(56) References Cited

U.S. PATENT DOCUMENTS

| | | | | |
|---|---|---|---|---|
| 10,678,666 B1* | 6/2020 | Gauf | ................... | G06F 11/2635 |
| 2009/0037882 A1* | 2/2009 | Allen | ................... | G06F 11/3688 |
| | | | | 717/125 |
| 2011/0239104 A1* | 9/2011 | Prasad | ................ | G06F 11/3684 |
| | | | | 715/234 |
| 2013/0042222 A1* | 2/2013 | Maddela | ............. | G06F 11/3684 |
| | | | | 717/124 |

(Continued)

OTHER PUBLICATIONS

Theofilos Petsios et al., NEZHA: Efficient Domain-Independent Differential Testing, 2017, [Retrieved on Jun. 13, 2025]. Retrieved from the internet: <URL: https://ieeexplore.ieee.org/stamp/stamp.jsp?tp=&arnumber=7958601> 18 Pages (615-632) (Year: 2017).*

*Primary Examiner* — Anibal Rivera
(74) *Attorney, Agent, or Firm* — Jonathan H. Harder; Stephen A. Mason; Dickinson Wright PLLC

(57) ABSTRACT

A computing device includes a memory device storing instructions, and a processing device communicatively coupled to the memory device. The processing device executes the instructions to execute a computer-implemented system configured to manage items in a self-describing data system, wherein the items are associated with a user interface and the computer-implemented system is associated with a first version; execute a third-party computer-implemented system configured to execute an application that accesses the user interface, wherein the third-party computer-implemented system is associated with a second version; and execute a test automation framework (TAF) configured to use the third-party computer-implemented system to perform tests on the user interface associated with the items. The TAF comprises libraries including code specific to the first version of the computer-implemented system and code specific to the second version of the third-party computer-implemented system.

20 Claims, 33 Drawing Sheets

(51) Int. Cl.
*G06F 9/44* (2018.01)
*G06F 11/263* (2006.01)
*G06F 11/36* (2025.01)
*G06F 11/3668* (2025.01)
*G06F 11/3698* (2025.01)
*G06F 8/41* (2018.01)
*G06F 8/71* (2018.01)
*G06F 9/451* (2018.01)

(52) U.S. Cl.
CPC .................. *G06F 8/41* (2013.01); *G06F 8/71* (2013.01); *G06F 9/451* (2018.02); *G06F 11/3668* (2013.01); *G06F 11/3672* (2013.01); *G06F 11/3688* (2013.01)

(58) Field of Classification Search
CPC .. G06F 11/3672; G06F 11/3668; G06F 11/36; G06F 11/26; G06F 8/71; G06F 8/41; G06F 9/451
See application file for complete search history.

(56) References Cited

U.S. PATENT DOCUMENTS

| | | | |
|---|---|---|---|
| 2013/0152047 A1* | 6/2013 | Moorthi | G06F 11/3664 717/124 |
| 2015/0074646 A1* | 3/2015 | Herrin | G06F 8/71 717/124 |
| 2015/0286556 A1* | 10/2015 | Ellis | G06F 11/3688 717/125 |
| 2018/0060221 A1* | 3/2018 | Yim | G06F 9/44536 |
| 2018/0089066 A1* | 3/2018 | Barnett | G06F 11/3688 |
| 2019/0303269 A1* | 10/2019 | Arieli | G06F 11/3672 |
| 2020/0241865 A1* | 7/2020 | Phong | G06F 8/71 |
| 2020/0319995 A1* | 10/2020 | Mitra | G06F 16/958 |
| 2021/0390038 A1* | 12/2021 | Mietke | G06F 11/3676 |
| 2023/0019006 A1* | 1/2023 | Villarroel Humérez | G05B 13/0265 |
| 2023/0195825 A1* | 6/2023 | Rao | G06F 16/986 715/235 |

\* cited by examiner

FIG. 1

<Item type = "Part" id="ABCDEF012345" action="get"/>
     105                110              115

```
<Item type="Part" action="add">
    <item_number>999-888</item_number>
    <description>Some Assy</description>
    <Relationships>
        <Item type="Part BOM" action="add">
            <quantity>10</quantity>
            <related_id>
                <Item type="Part" action="add">
                    <item_number>123-456</item_number>
                    <description>1/4w 10% 10K Resistor</description>
                </Item>
            </related_id>
        </Item>
    </Relationships>
</Item>
```

FIG. 7A

```xml
<?xml version="1.0"?>
-<AML>
  -<Item action="qry_ExecuteQueryDefinition" type="qry_QueryDefinition">
     <root_query_item_ref_id>part_1</root_query_item_ref_id>
     <name>UseCase_1</name>
   -<Relationships>
      -<Item type="qry_QueryCondition">
        -<condition_xml>
           <![CDATA[<condition> <eq> <property ref-id="TopPart_id_GUID"/> <property ref-
           id="PBom_sourceId_GUID"/> </eq> </condition> ]]>
         </condition_xml>
         <ref_id>join_cond_1</ref_id>
       </Item>
      -<Item type="qry_QueryCondition">
        -<condition_xml>
           <![CDATA[<condition> <eq> <property ref-id="PBom_relatedId_GUID"/> <property ref-
           id="RelPart_id_GUID"/> </eq> </condition> ]]>
         </condition_xml>
         <ref_id>join_cond_2</ref_id>
       </Item>
      -<Item type="qry_QueryCondition">
        -<condition_xml>
           <![CDATA[<condition> <gt> <property ref-id="PBom_quantity_GUID"/>
           <constant>5</constant> </gt> </condition> ]]>
         </condition_xml>
         <ref_id>cond_1</ref_id>
       </Item>
      -<Item type="qry_QueryItem">
         <alias>TopPart</alias>
         <condition_ref_id/>
         <item_type type="ItemType" name="Part"
         keyed_name="Part">4F1AC04A28484F3ABA4E20DB63808A88</item_type>
         <ref_id>part_1</ref_id>
        -<Relationships>
          -<Item type="qry_QueryItemSelectProperty">
             <property_ref_id>TopPart_id_GUID</property_ref_id>
           </Item>
          -<Item type="qry_QueryItemSelectProperty">
             <property_ref_id>TopPart_itemNumber_GUID</property_ref_id>
           </Item>
          -<Item type="qry_QueryItemSelectProperty">
             <property_ref_id>TopPart_createdById_GUID</property_ref_id>
           </Item>
          -<Item type="qry_QueryItemSortProperty">
             <property_ref_id>TopPart_name_GUID</property_ref_id>
             <sort_order>128</sort_order>
             <sort_order_direction>Ascending</sort_order_direction>
           </Item>
         </Relationships>
```

FIG. 7B

```xml
        </Item>
        <Item type="qry_QueryItem">
            <alias>PBom</alias>
            <condition_ref_id>cond_1</condition_ref_id>
            <item_type type="ItemType" name="Part BOM" keyed_name="Part
                BOM">5E9C5A12CC58413A8670CF4003C57848</item_type>
            <ref_id>part_bom_1</ref_id>
          + <Relationships>
        </Item>
        <Item type="qry_QueryItem">
            <alias>RelPart</alias>
            <condition_ref_id/>
            <item_type type="ItemType" name="Part"
                keyed_name="Part">4F1AC04A2B484F3ABA4E20DB63808A88</item_type>
            <ref_id>part_2</ref_id>
          - <Relationships>
              - <Item type="qry_QueryItemSelectProperty">
                    <property_ref_id>RelPart_itemNumber_GUID</property_ref_id>
                </Item>
            </Relationships>
        </Item>
        <Item type="qry_QueryReference">
            <child_ref_id>part_bom_1</child_ref_id>
            <condition_ref_id>join_cond_1</condition_ref_id>
            <parent_ref_id>part_1</parent_ref_id>
            <ref_id>qref_1</ref_id>
        </Item>
        <Item type="qry_QueryReference">
            <child_ref_id>part_2</child_ref_id>
            <condition_ref_id>join_cond_2</condition_ref_id>
            <parent_ref_id>part_bom_1</parent_ref_id>
            <ref_id>qref_2</ref_id>
        </Item>
        </Relationships>
    </Item>
</AML>
```

- 715b: PBom QueryItem
- 715c: RelPart QueryItem
- 720d: QueryItemSelectProperty
- 730a: QueryReference qref_1
- 730b: QueryReference qref_2

```
<Item type="qry_QueryDefinition" action="qry_ExecuteSimplifiedQueryDefinition">
  <Parameters>
    <parameter name="@PartNumber" type="string" value="IN-00001" />
  </Parameters>
  <Relationships>
    <Item type="Part" qb:alias="Part" qb:select="id, item_number">
      <qb:filter>
        <eq>
          <property qb:alias="Part.item_number" />
          <parameter name="@PartNumber" />
        </eq>
      </qb:filter>
    </Item>
  </Relationships>
</Item>
```

900

905 — `<parameter name="@PartNumber" type="string" value="IN-00001" />`

907 — `</Parameters>`

910 — `<qb:filter> ... </qb:filter>`

FIG. 10

```
                                                                    ┌─1000
<Item type="qry_QueryDefinition"
action="qry_ExecuteSimplifiedQueryDefinition">
  <Parameters>
    <parameter name="@Levels" type="integer" value="2" />
  </Parameters>
  <Relationships>
    <Item type="Part" qb:alias="Part" qb:select="id, item_number">
      <Relationships>
        <Item type="Part BOM" qb:alias="Part BOM" qb:select="id">
          <qb:fetch>
            <if>
              <condition>
                <match-path>
                  <parameter name="@ExecutionPath" />
                  <format-string format="QR1/(QR2/QR1){#0}/">
                    <argument-value key="#0">
                      <parameter name="@Levels" />
                    </argument-value>
                  </format-string>
                </match-path>
              </condition>
              <then>0</then>
            </if>
          </qb:fetch>
        </Item>
      </Relationships>
    </Item>
  </Relationships>
</Item>
```

1005 — Parameters block
1010 — Part BOM item block

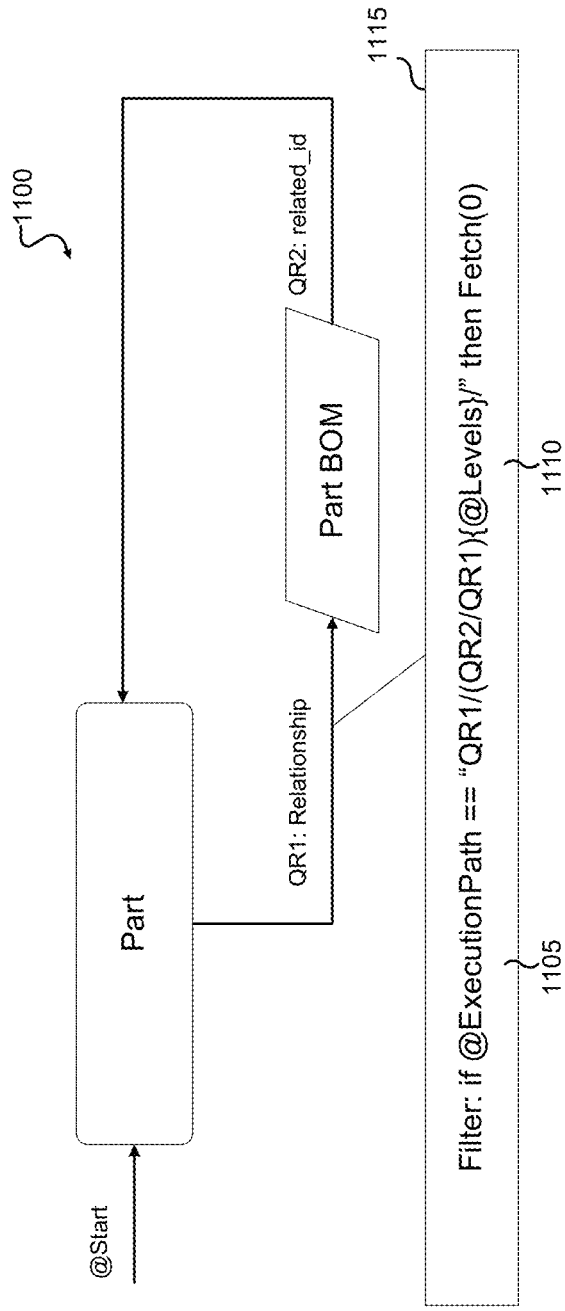

FIG. 12A

```xml
<?xml version="1.0"?>
<SOAP-ENV:Envelope xmlns:SOAP-ENV="http://schemas.xmlsoap.org/soap/envelope/">
  <SOAP-ENV:Body>
    <Result>
      <Item type="TopPart">                                                              ⎫
        <created_by_id keyed_name="Innovator Admin">30B991F927274FA38298655F50C99472E</created_by_id>  ⎬ 1205a
        <id keyed_name="part_1">5B3E6A6A639B4B0AAE9E30E5E9403B</id>
        <item_number>part_1</item_number>
      </Item>
      <Item type="TopPart">                                                              ⎫
        <created_by_id keyed_name="Innovator Admin">30B991F927274FA38298655F50C99472E</created_by_id>  ⎪
        <id keyed_name="part_2">F1C732616SD4130B12F33CC840975A5</id>                     ⎪
        <item_number>part_2</item_number>                                                ⎪
        <Relationships>                                                                  ⎪
          <Item type="PBom">                                                             ⎪
            <quantity>18</quantity>                                                      ⎪
            <related_id keyed_name="part_3"/>                                            ⎪
          </Item>                                                                        ⎪
          <Item type="PBom">                                                             ⎬ 1205b
            <quantity>12</quantity>                                                      ⎪
            <related_id keyed_name="part_3"/>                                            ⎪
            <Item type="RelPart">                                                        ⎪
              <item_number>part_3</item_number>                                          ⎪
            </Item>                                                                      ⎪
          </related_id>                                                                  ⎪
          </Item>                                                                        ⎪
          <Item type="PBom">                                                             ⎪
            <quantity>7</quantity>                                                       ⎪
            <related_id keyed_name="part_4"/>                                            ⎪
            <Item type="RelPart">                                                        ⎪
              <item_number>part_4</item_number>                                          ⎪
            </Item>                                                                      ⎪
          </related_id>                                                                  ⎪
          </Item>                                                                        ⎪
        </Relationships>                                                                 ⎪
      </Item>                                                                            ⎭
      <Item type="TopPart">                                                              ⎫
        <created_by_id keyed_name="Innovator Admin">30B991F927274FA38298655F50C99472E</created_by_id>  ⎪
        <id keyed_name="part_3">10886AD522F2AA3987AB34A22E3C7895</id>                    ⎪
        <item_number>part_3</item_number>                                                ⎪
        <Relationships>                                                                  ⎬ 1205c
          <Item type="PBom">                                                             ⎪
            <quantity>11</quantity>                                                      ⎪
            <related_id keyed_name="part_4"/>                                            ⎪
            <Item type="RelPart">                                                        ⎪
              <item_number>part_4</item_number>                                          ⎪
            </Item>                                                                      ⎪
          </related_id>                                                                  ⎪
          </Item>                                                                        ⎪
        </Relationships>                                                                 ⎪
      </Item>                                                                            ⎭
```

```
<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">
                                            <id>PD_1</id>
                                        </Item>
                                    </Relationships>
                                </Item>
                            </Relationships>
                        </Item>
                    </Relationships>
                </Item>
            </Relationships>
        </Item>
    </Relationships>
</Item>
</AML>
```

1405 (bracket indicating the nested inner block)

```
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

FIG. 23

```
// methods, which allow to select a TOC Item by the specified path:
Actor.AttemptsTo(Select.TocItem.ByPath("Administration/ItemType"));
Actor.AttemptsTo(Select.TocItem.ByPath("Administration", "ItemType"));

// expand TOC by the provided path:
Actor.AttemptsTo(Expand.TocItem("Administration/ItemType"));
```

```
// confirm that number of rows in the grid is greater than 2:
Actor.ChecksThat(maingrid.Rows.Count, Is.GreaterThan(2));

// check that value in the first cell of the first row is equal to some value:
Actor.ChecksThat(maingrid.Rows.CellValue(1, 1), Is.EqualTo(expectedValue));

// get list of values from specified column of the grid:
Actor.AskFor(maingrid.Column.Columns("Column Label"));

// get the 'Favorite' toggle button on the main grid title bar and click on it:
var titleBar = Actor.AskFor(maingrid.Rows.Columns.titleBar);
var favoriteToggleButton = titleBar.actionsbar.togglebuttons.of(titleBar);
Actor.AttemptsTo(Click.On(favoriteToggleButton));

// get the index for some specific column in the main grid:
var columnNumber = Actor.AskFor(maingrid.Rows.Columns.IndexOfColumn(columnName, containerQuestion));
```

   

SYSTEM AND METHOD FOR A TEST AUTOMATION FRAMEWORK ASSOCIATED WITH A SELF-DESCRIBING DATA SYSTEM

CROSS-REFERENCES TO RELATED APPLICATIONS

This application is a continuation of U.S. Provisional Patent Application Ser. No. 63/256,400 filed Oct. 15, 2021, titled "SYSTEM AND METHOD FOR A TEST AUTOMATION FRAMEWORK ASSOCIATED WITH A SELF-DESCRIBING DATA SYSTEM," the entire disclosure of which is hereby incorporated by reference for all purposes.

TECHNICAL FIELD

This disclosure relates generally to testing technology. More specifically, this disclosure relates to a test automation framework associated with a self-describing data system.

BACKGROUND

Various computer-implemented systems (e.g., software applications implemented in computer code) enable customizing functionality, user interface elements, data sources, and the like. In some embodiments, the computer-implemented systems may use data expressed in certain markup languages and stored in a database, in particular, a relationship database, such as a. SQL server database. Entities may desire to test the customized functionality, user interface elements, data sources, and the like prior to releasing the customizations to production environments.

SUMMARY

In one embodiment, a computing device includes a memory device storing instructions, and a processing device communicatively coupled to the memory device. The processing device executes the instructions to execute a computer-implemented system configured to manage items in a self-describing data system, wherein the items are associated with a user interface and the computer-implemented system is associated with a first version; execute a third-party computer-implemented system configured to execute an application that accesses the user interface, wherein the third-party computer-implemented system is associated with a second version; execute a test automation framework (TAF) module configured to use the third-party computer-implemented system to perform one or more tests on the user interface associated with at least one of the items, wherein the TAF module comprises one or more libraries including code specific to the first version of the computer-implemented system and code specific to the second version of the third-party computer-implemented system.

In one embodiment, a method includes for executing a test automation framework (TAF), wherein the method comprises: receiving, at the TAF, a request to perform a test associated with a computer-implemented system, wherein the request comprises a version of the computer-implemented system; determining, using a library included in the TAF, first code to execute based on the version of the computer-implemented system, wherein the first code is associated with the version of the computer-implemented system; determining second code to execute based on a second version of a third-party computer-implemented system, wherein the third-party computer-implemented system uses an application to perform the test on a user interface associated with the computer-implemented system, and the user interface comprises one or more items included in a self-describing data system of the computer-implemented system; and executing, using the first code and second code, the test.

In some embodiments, computer-implemented methods stored as instructions in one or more memory devices may be executed by one or more processing devices to perform any of the operations disclosed herein.

In some embodiments, tangible, non-transitory computer-readable mediums storing instructions that, when executed, cause one or more processing devices to perform any of the operations disclosed herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example of a tag creating an instance of an item in a self-describing data system according to various embodiments of this disclosure;

FIG. 3 illustrates an example of a configuration document for an item according to certain embodiments of this disclosure;

FIGS. 7A and 7B illustrate an example of a configuration document setting forth the configuration of a query based on a self-describing data model according to certain embodiments of this disclosure;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIG. 11 illustrates, in wireframe format, an example of a query execution path for a query performed according to embodiments of this disclosure;

FIGS. 12A and 12B illustrate an example of a markup language document comprising query results obtained and outputted according to various embodiments of this disclosure;

FIGS. 14A and 14B illustrate query results outputted according to embodiments of this disclosure;

FIG. 23 illustrates various actions to be performed by a test associated with the navigation panel and table of contents according to embodiments of this disclosure;

FIG. 25 illustrates various actions to be performed by a test associated with the grid according to embodiments of this disclosure;

DETAILED DESCRIPTION

Figure 2:
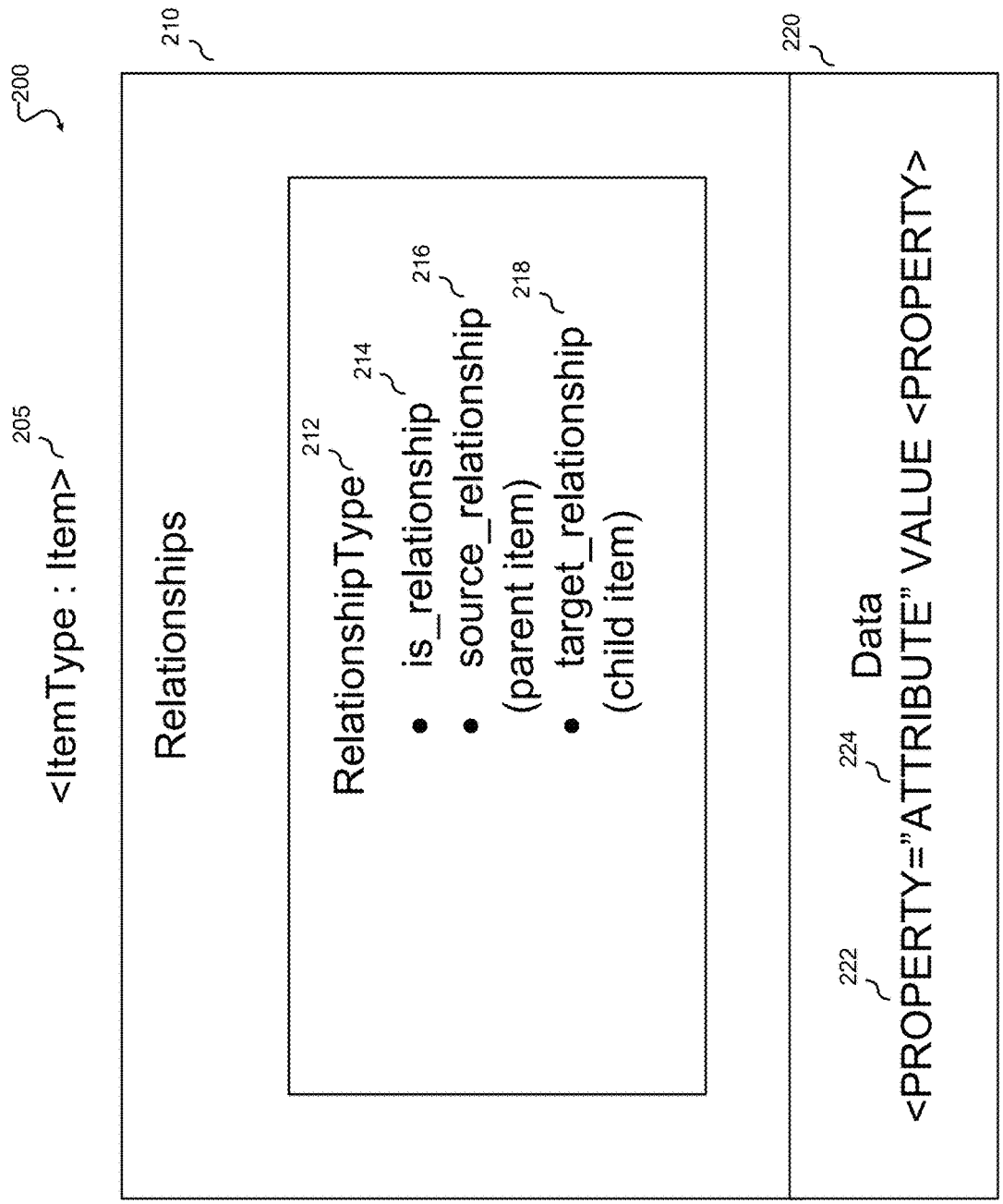
FIG. 2 illustrates, at a structural level aspects of the configuration of an item in a self-describing data system according to various embodiments of this disclosure.

FIGS. 1 through 30, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates an example of an <item> tag 100 defining an instance of an item in a self-describing data system according to various embodiments of this disclosure.

According to certain embodiments, the foundational element of a self-describing data system is an item, instances of which may be maintained in persistent storage in a relational database. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML, document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>" In this example, the property "cost" is further specified through the "between" attribute for which the values 10.00 and 50.00 are specified.

According to certain embodiments, the configuration 200 for an item may further include history data for the item, showing some or all of the previous configurations of the item.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
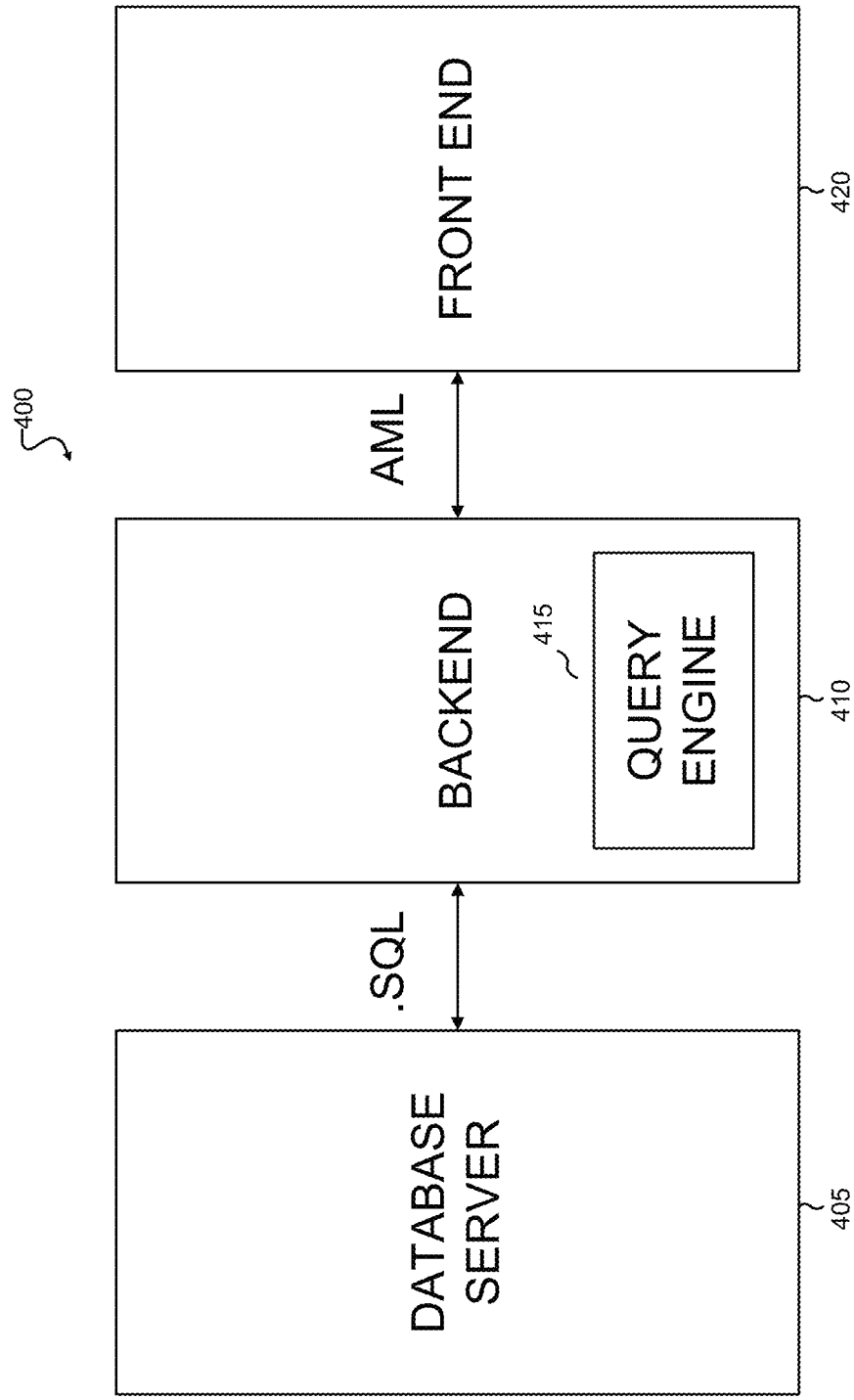
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415, and a front end 420.

According to certain embodiments, database server 405 is a server hosting data and implementing one or more database applications supporting query functionalities. Database server 405 is generally platform-agnostic and may host data in a number of known database formats, including a relational database format (for example, by running an instance of SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. In certain embodiments, front end 420 may be constructed using modules from the HTML 5 DOJO toolkit. According to certain further embodiments, front end 420 may provide an interface through which users can configure parameters of queries and set permissions for queries.

Figure 5:
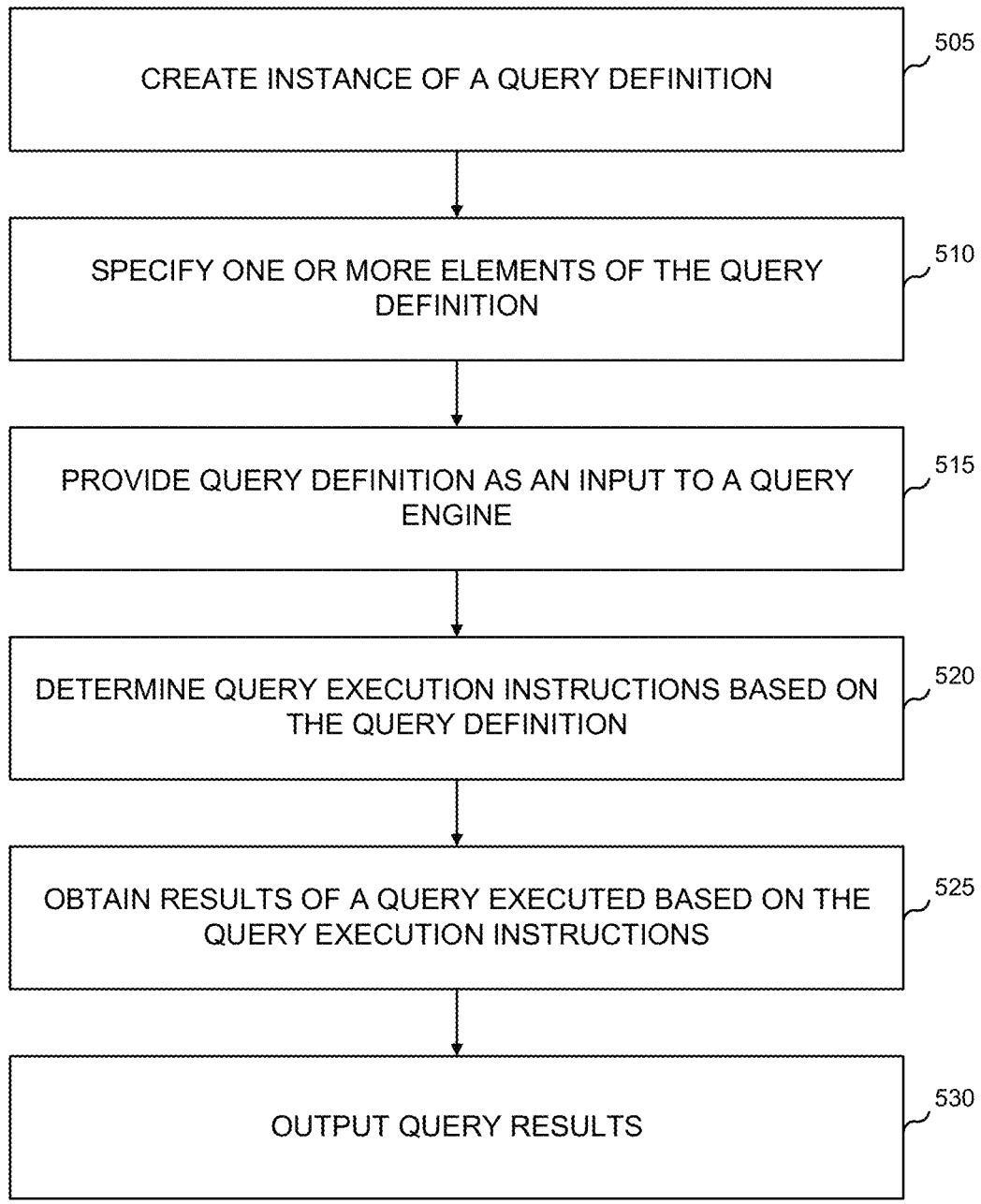
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

<Item action="*qry*_Execute
    QueryDefinition"type="*qry*_QueryDefinition">

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 510, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

mented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
| --- | --- | --- | --- |
| classification | Classification | | Aggregation (GroupBy, SUM, AVG) Union Intersection Special Join |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

Figure 6:
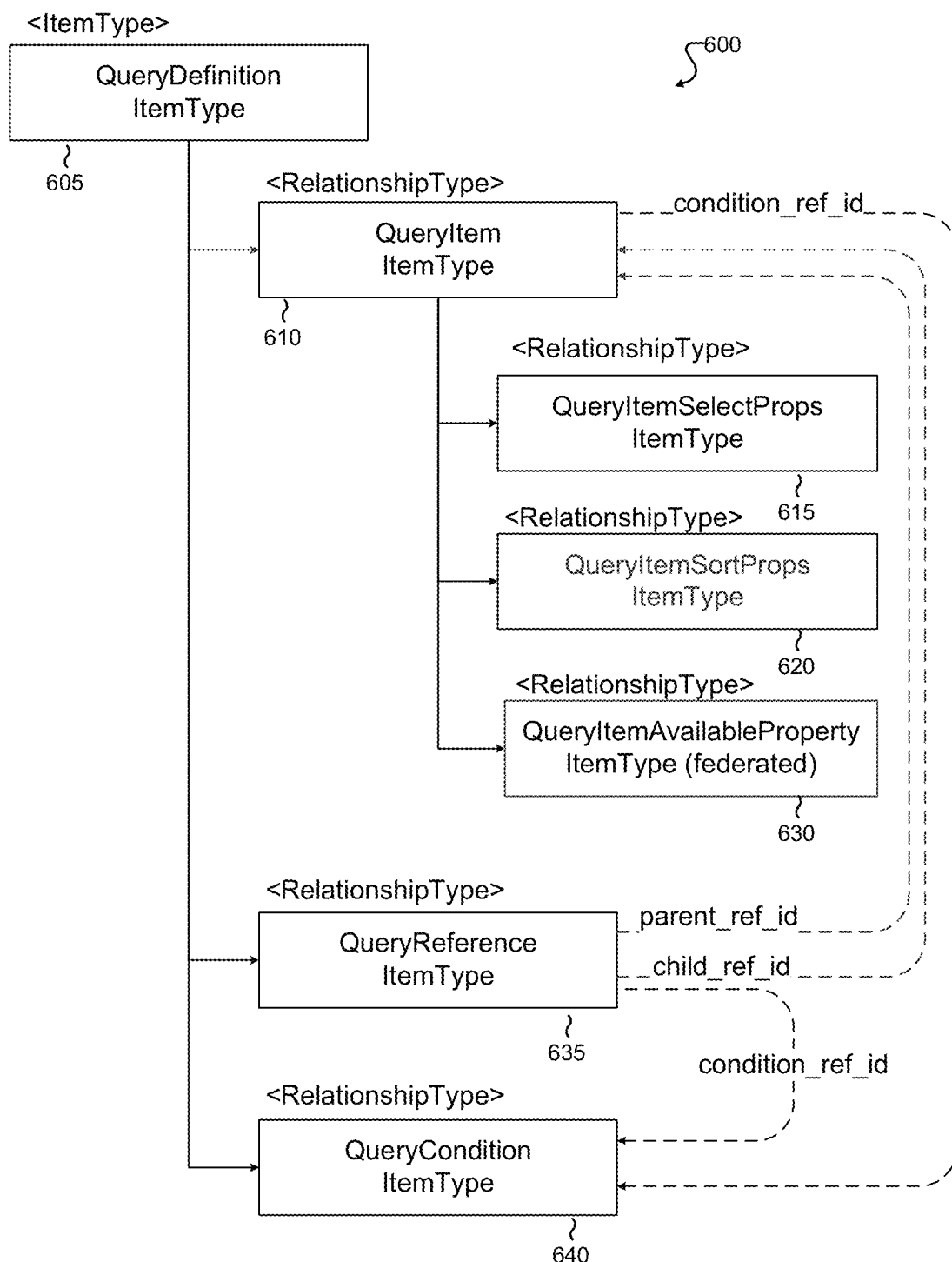
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be imple- As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
| --- | --- | --- | --- |
| property_ref_id | Property | String | Reference to qry_QueryItemAvailableProperty via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
| --- | --- | --- | --- |
| property_ref_id | Property | String | Reference to qry_QueryItemAvailableProperty via ref_id value. |
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
| --- | --- | --- | --- |
| source_id | | Item (qry_QueryItem) | Reference to qry_QueryItem |
| Name | Name | String | |
| Label | Label | MLString | |
| Type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. As shown in TABLE 5, below, in some embodiments, query reference 635 operates to specify relationships between query items in an analogous manner as relationships 212 in FIG. 2. An overview of properties of query reference 635 is set forth in Table 6, below:

TABLE 6

| Name | Label | Type | Description |
| --- | --- | --- | --- |
| parent_ref_id | Parent Item | String | Referenced parent Query Item. |

TABLE 6-continued

| Name | Label | Type | Description |
| --- | --- | --- | --- |
| child_ref_id | Child Item | String | Referenced child Query Item. |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in Table 7 below:

TABLE 7

| Name | Label | Type | Description |
| --- | --- | --- | --- |
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710a, 710b and 710c specifying filters to be applied in the query. In this particular example, the properties of each of query condition items 710a through 710c are further specified by attributes further controlling the execution logic of the query. For example, in query condition item 710, the <condition> attribute is used to define the filter, as shown by the statement "<![CDATA[<condition> <eq> <property ref-id=" TopP_art_id_GUID "/> <property ref-id="PBom_sourceId_GUID "/> </eq> </condition>]]>".

Configuration document 700 further includes query items 715a, 715b and 715c which, set forth properties to be part of the query response, and the properties to be used in joins and filtering. For example, query item 715a specifies an item, having the name "part" and the attribute "keyed_name," with the value "4F1AC04A2B484F3ABA4E20DB63808A88" as a filter for items to be returned by the query.

In the non-limiting example of FIGS. 7A and 7B, query document 700 further comprises query item selection properties 720a, 720b, 720c and 720d, which variously specify properties from query items 715a and 715c to include in the query response. For example, query item selection property 720a specifies the property "TopPart_id" as a property to be returned with query response items satisfying the filter criterion "keyed_name"="4F1AC04A2B484F3ABA4E20DB63808A88" specified by query item 715a.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort_order_direction" whose value "Ascending" indicates that the query response items are to be sorted by "TopPart_name" in ascending order.

As shown in the non-limiting example of FIGS. 7A and 7B, query document 700 further includes query reference items 730a and 730b, which specify how, in executing the query, data is collected and aggregated across query items which have relationships with other query items within the query definition. In this particular example, query reference items 730a and 730b specify join requirements, as shown, for example, by the property "<condition_ref_id>join_cond_1</condition_ref_id>" in query reference item 730a.

Figure 8:
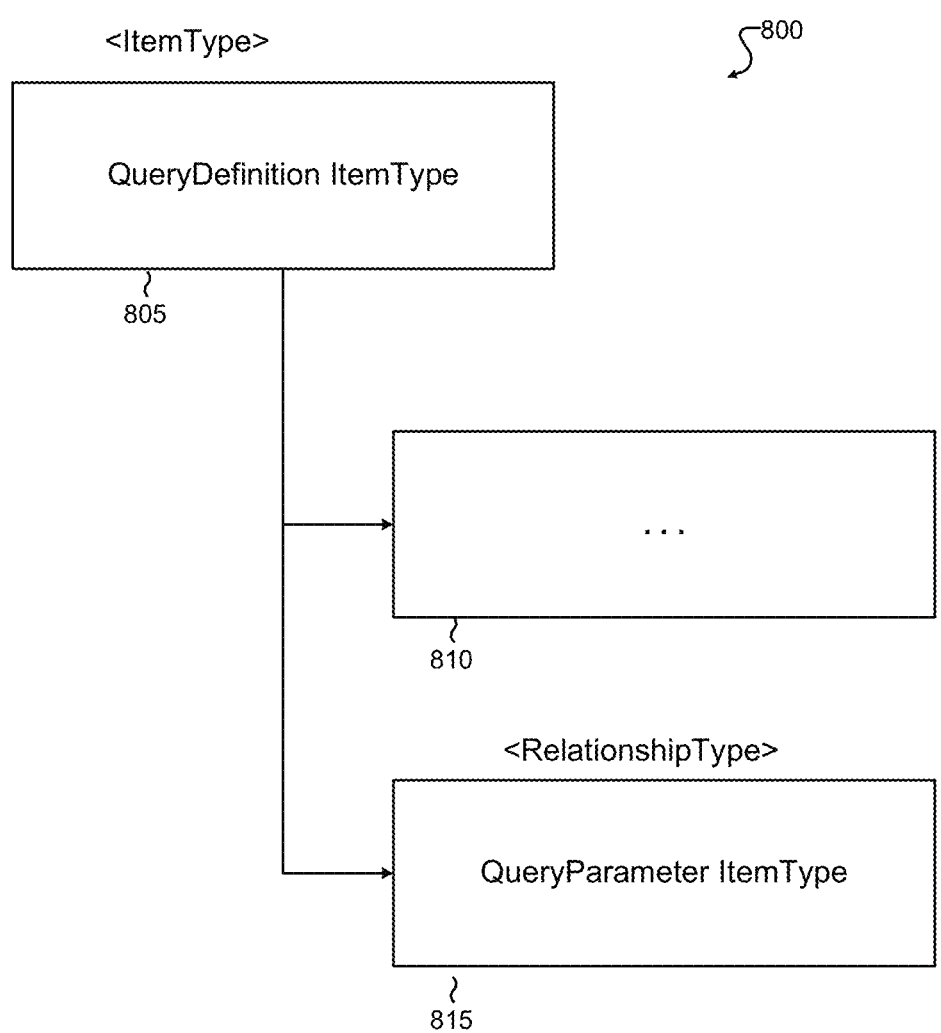
FIG. 8 at a structural level, an exemplary embodiment of an extension of a data model 800 for configuring recursive searches of a self-describing data system.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730a in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath "QR1/(QR2/QR1){@Levels/}/" then Fetch(0)." In this non-limiting example, if the value of the parameter "@Levels" is zero, then the query pulls no items, because/QR1(/(QR2/QR1){0}/is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

Figure 12B:
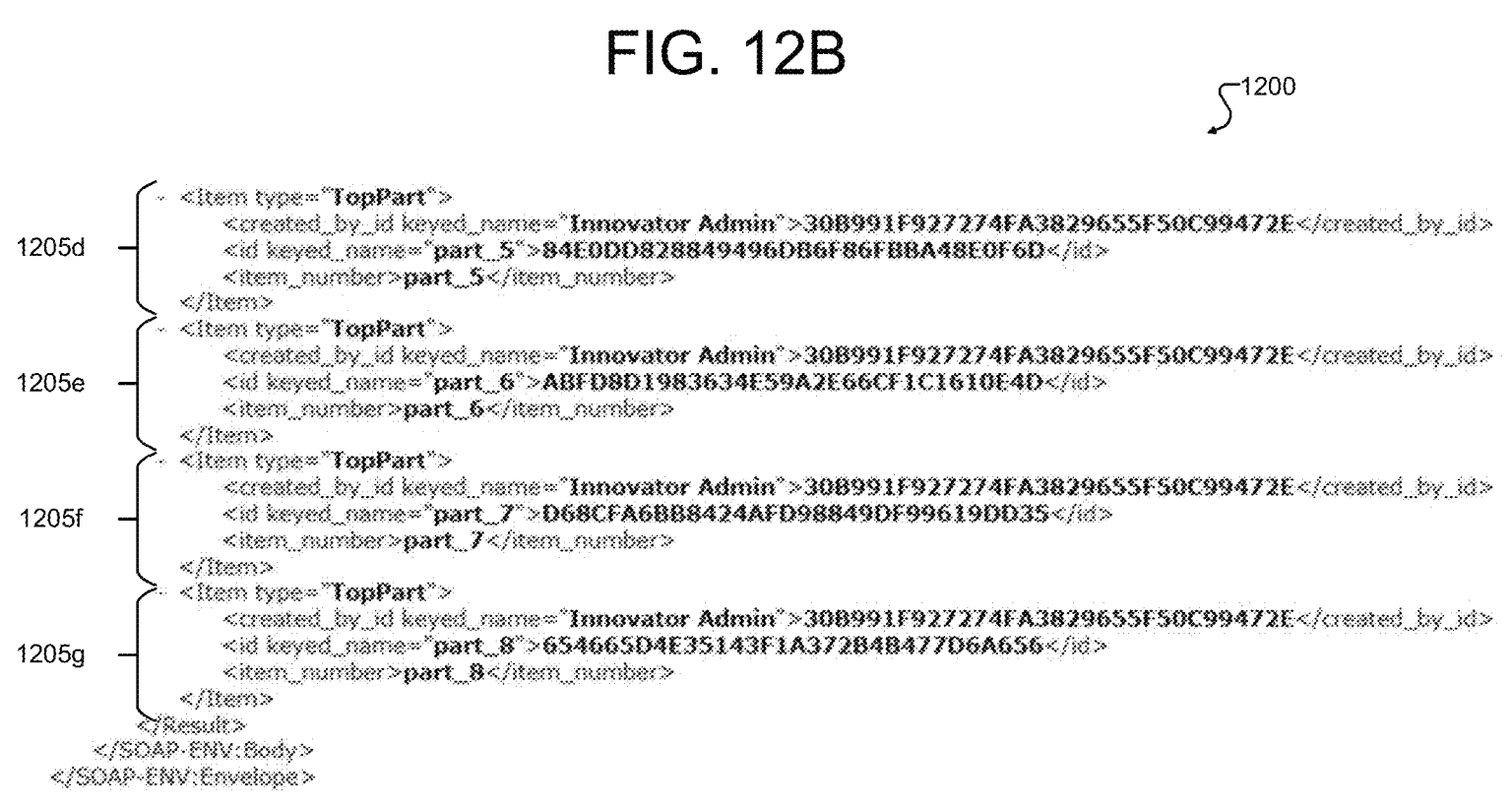

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205a through 1205g, which, as specified by query item selection property 720c in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205b.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
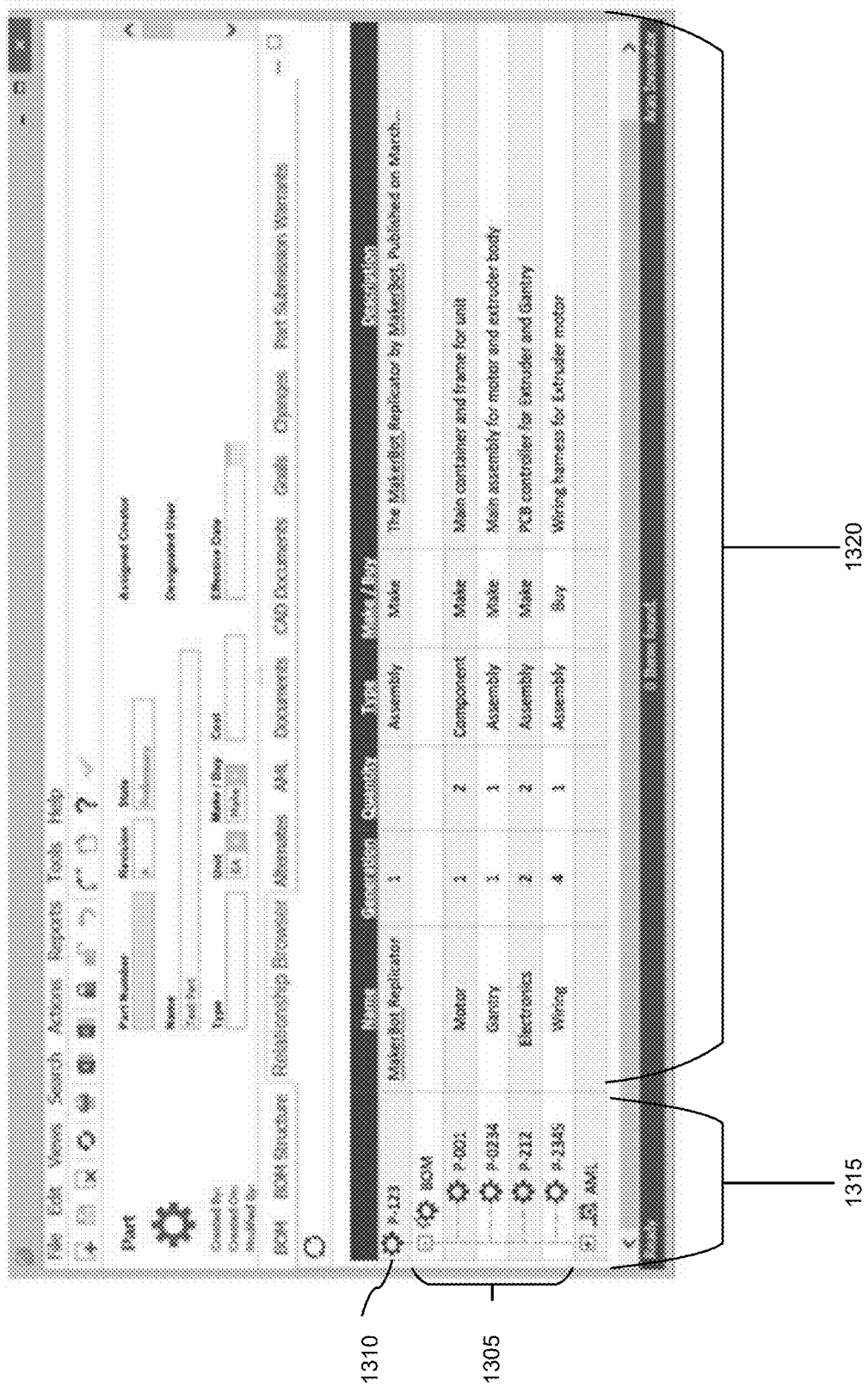
FIG. 13 illustrates of query results output in a tree grid format according to various embodiments of this disclosure.

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship> container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship> container tags 1405. Further, according to certain embodiments, query result set 1400 may be readily converted into a structured result by calling the "qry_ConvertFlatToStructuredResult" method of the Aras IOM API.

The functionality and performance of query engines according to embodiments of this disclosure may be further enhanced by through the use of extended classification items. Extending the data model of a self-describing data system through the use of extended classifications may enhance the ability of the query engine to perform queries of polyhierarchical relationships, equivalence and associative relationships. Further, extended classifications according to embodiments of this disclosure may enhance the operation of a query engine, by enabling users to add additional properties to an item, without changing the underlying item type of the item. In this way, searches across the additional properties may be conducted quickly, in that the result set will not necessarily include null classes for the item instances not having the newly added (or extended) properties.

According to certain embodiments, an extended classification encompasses a kind of item, defining a collection of properties, which are specific to an object classified by a term. Further, in some embodiments, an extended property comprises a property which exists on a global scope and which is not specific to any one item type. According to certain embodiments, extended properties may be defined via one or more extended classifications.

Figure 15:
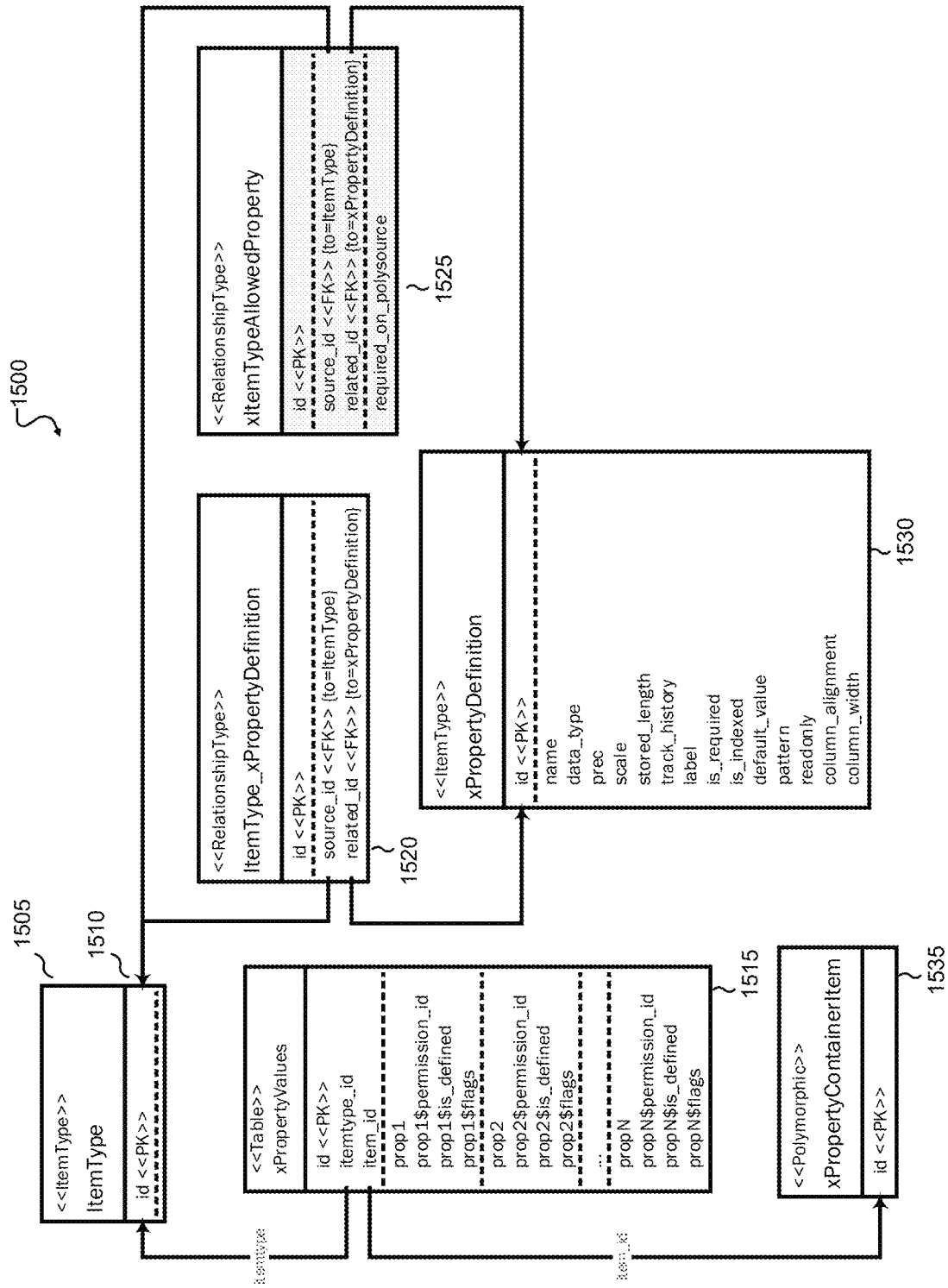
FIG. 15 illustrates a data model for implementing extended properties in a self-describing data system according to various embodiments of this disclosure.

FIG. 15 illustrates a data model 1500 for implementing extended properties in a self-describing data system according to various embodiments of this disclosure.

As shown in the non-limiting example of FIG. 15, data model 1500 is hierarchical and anchored, or rooted to an instance of an item type 1505, whose properties include an "id" value 1510 which operates as a primary key specifying relationships between instance of an item type 1505 and extended property items 1515-1535.

According to various embodiments, data model 1500 describes a self-describing system whose items follow an "/Item/Relationship/Item/Relationship" structural pattern. Further, data model 1500 comprises xPropertyDefinition ItemType 1530, which defines a property which is defined on a global scope and is not specific to any one item type. As shown in FIG. 15, xPropertyDefinition ItemType 1530 is a child of ItemType_xPropertyDefinition Relationship Type 1520. A list of properties supported by xProperty Definition ItemType 1530 is shown in TABLE 8 below:

TABLE 8

| Property Name | Label | Data Type |
| --- | --- | --- |
| name | Name | string (32) |
| label | Label | ml_string |
| data_type | Data Type | list (Data Types) |
| data_source | Data Source | Item (ItemType) |
| stored_length | Length | integer |
| prec | Precision | integer |
| scale | Scale | integer |
| is_required | Required | boolean |
| is_indexed | Indexed | boolean |
| column_alignment | Alignment | list (Text Alignment) |
| column_width | Width | integer |
| default_value | Default Value | ml_string |
| pattern | Pattern | string (512) |
| readonly | Read Only | boolean |
| help_tooltip | Tooltip | ml_string |
| track_history | Track History | boolean |

According to certain embodiments, data model 1500 further comprises ItemType_xPropertyDefinition Relationship Type 1520, which describes a link between a particular ItemType and an xPropertyDefinition ItemType 1530. According to various embodiments, any xProperty Definition can be assigned to multiple ItemTypes and any ItemType may have multiple assigned)(Property definitions.

As shown in the non-limiting example of FIG. 15, data model 1500 may further comprise xItemTypeAllowedProperty Relationship Type 1525. According to certain embodiments, xItemTypeAllowedProperty Relationship Type 1525 describes a link between a particular ItemType and an xPropertyDefinition, which contains all allowed xProperties for the ItemType. As used in this disclosure, an allowed xProperty refers to an xProperty assigned to a particular ItemType, and which is the only xProperty which can be defined on Items of that particular ItemType.

According to certain embodiments, data model 1500 comprises xPropertyContainerItem 1535, which describes an ItemType which has at least one allowed xPropertyDefinition. When an xPropertyDefinition is assigned to this ItemType, this ItemType will be added to a list of polymorphic sources of xPropertyContainerItem 1535.

In some embodiments according to this disclosure, data model comprises a table of xPropertyValues 1515. As noted elsewhere in this disclosure, the implementation of extended classifications and extended properties enables properties to be dynamically added or removed from an instance of an ItemType without changing the type of the item. According to some embodiments, this may be accomplished by maintaining the values of the extended properties in a separate table from the items to which they relate.

Figure 16:
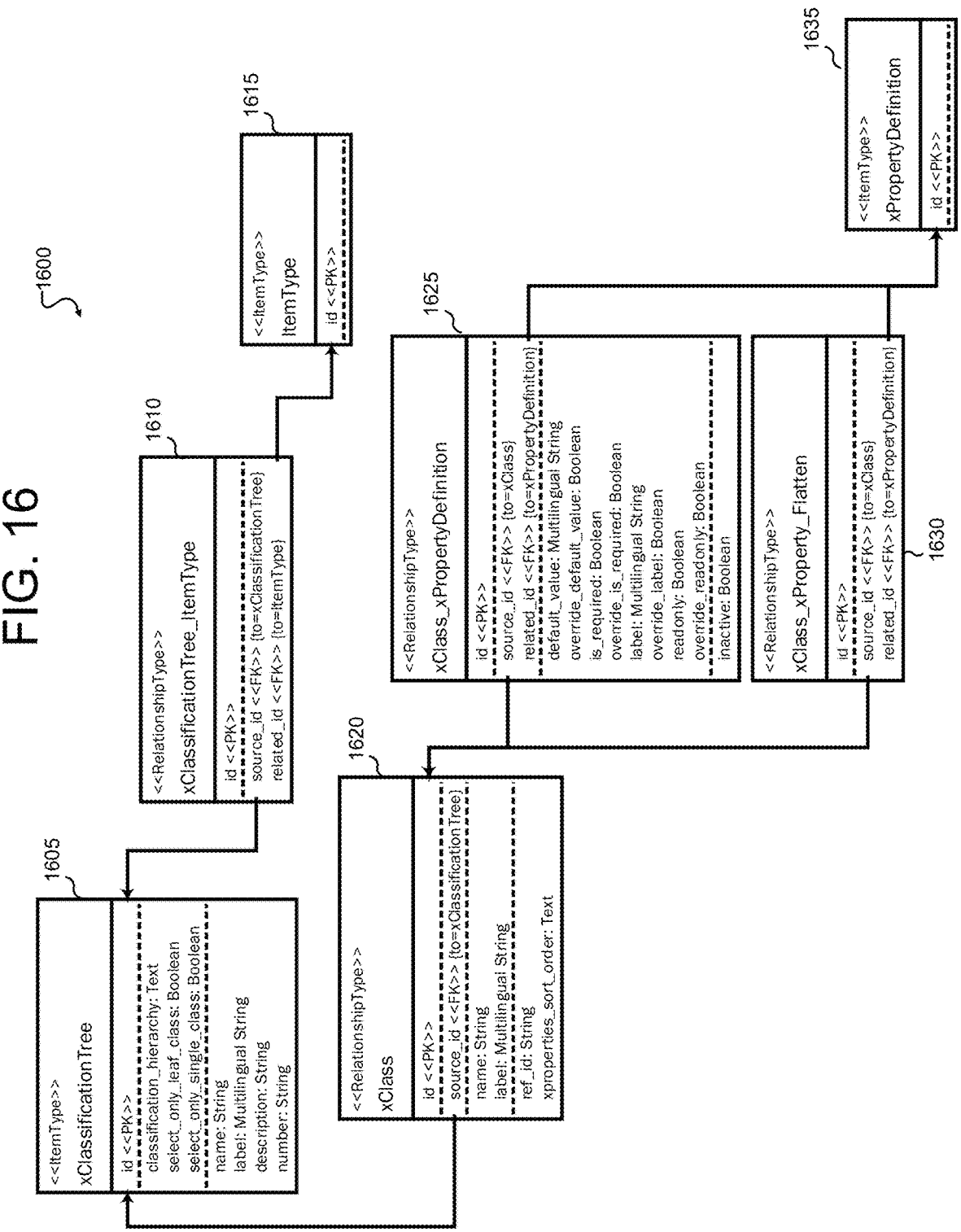
FIG. 16 illustrates an example of a data model for implementing extended classification according to embodiments of this disclosure.

As discussed elsewhere in this disclosure, an extended classification is a type of item which defines a collection of properties, which may be specific to an object classified by a term. FIG. 16 illustrates an example of a data model 1600 for implementing extended classification in a self-describing data system according to embodiments of this disclosure.

In the non-limiting example of FIG. 16, data model 1600 comprises, as its context item, or root, an instance of xClassificationTree ItemType 1605. According to embodiments, xClassificationTree ItemType 1605 defines a taxonomy, which is a collection of terms (also referred to as "xClasses," organized into a hierarchical structure. xClassificationTree ItemType 1605, is, according to certain embodiments, a self-contained unit which contains xClasses which are specific to only that tree. The properties of xClassficationTree ItemType 1605, according to certain embodiments are shown in Table 9, below:

TABLE 9

| Property Name | Label | Data Type |
| --- | --- | --- |
| name | Name | string (32) |
| item_number | Number | string (32) |
| description | Description | text |
| classification_hierarchy | Classification Hierarchy | text |
| label | Label | ml_string |
| select_only_leaf_class | Restrict Selection to only Leaf Classes | boolean |
| select_only_single_class | Restrict Selection to a Single Class | boolean |

According to embodiments, data model 1600 may further comprise xClassificationTree_ItemType RelationshipType 1610, which defines a list of dimensions available for xClassificationTree_ItemType 1605. xClassificationTree_ItemType RelationshipType 1610 may further be associated with one or more ItemTypes 1615.

In various embodiments according to this disclosure, data model 1600 may further comprise xClass Relationship Type 1620. As noted elsewhere instances of XClass represent a concept named by a term, which in turn define a collection of properties, further specified by xClass_XProperty Definition Relationship Type 1625.

In the non-limiting example of FIG. 16, data model 1600 includes xClass_xPropertyDefinition Relationship Type 1625, which describes a link between a particular xClass and an xPropertyDefinition.

Additionally, data model 1600 may further comprise instances of xClass_xProperty_Flatten Relationship Type 1630, which, describes a link between a particular xClass and xPropertyDefinition, and which contains all of the xProperties of a given xClass, including both the xClass's own properties and its inherited properties. According to some embodiments, a list of inherited properties may be calculated based on a hierarchy reflected in xClassificationTree_ItemType 1605. As shown in the non-limiting example of FIG. 16, xClass_xPropertyDefinition Relationship Type 1625 and xClass_xProperty_Flatten Relationship Type 1630, are in turn, lied to at least one instance of xPropertyDefinition ItemType 1635.

Figure 17:
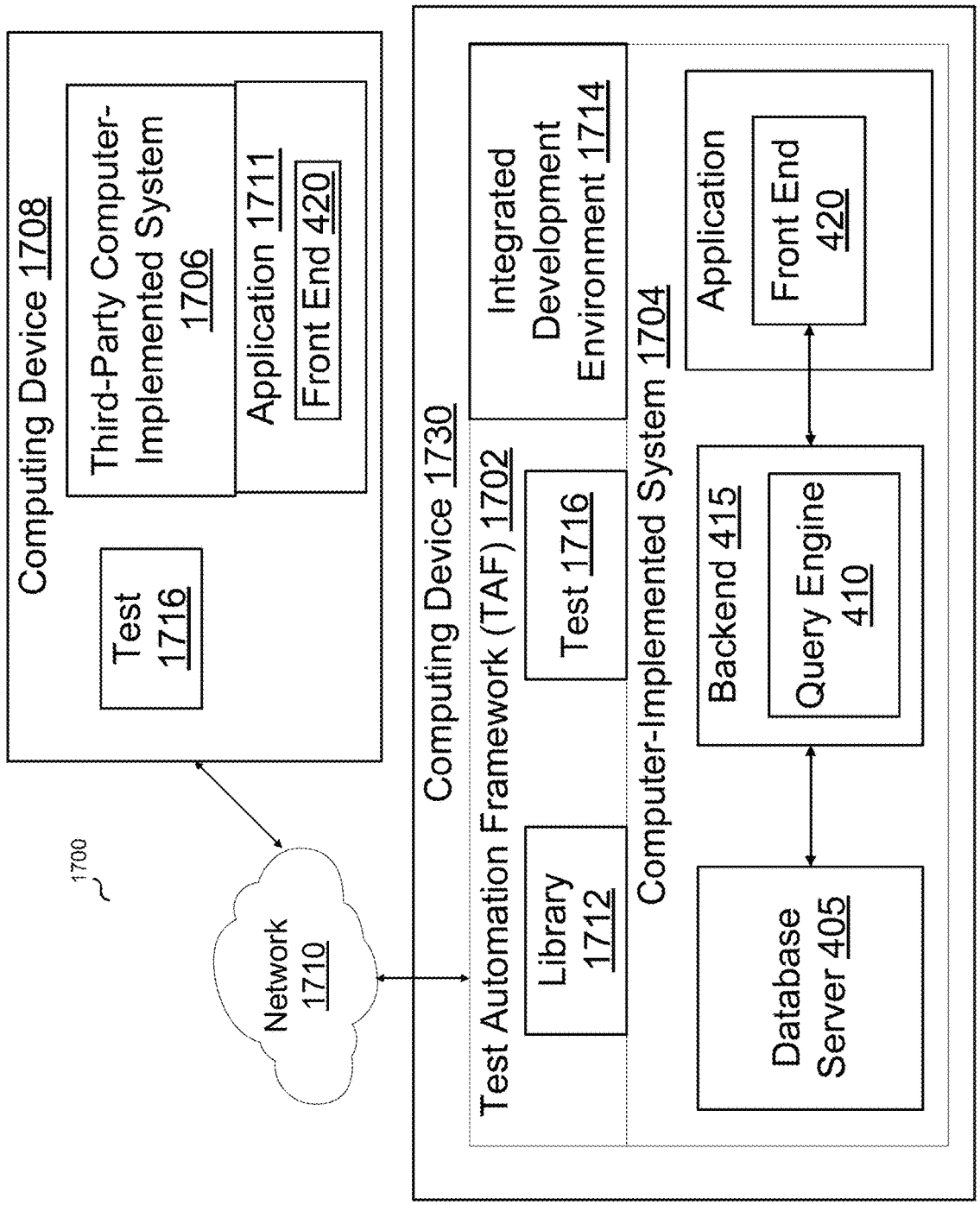
FIG. 17 illustrates an example architecture for providing a test automation framework associated with a self-describing data model according to embodiments of this disclosure.

FIG. 17 illustrates an example architecture 1700 for providing a test automation framework (TAF) 1702 associated with a self-describing data system according to embodiments of this disclosure. The self-describing data system may be stored in the database server 405. The TAF 1702 may be implemented in computer instructions stored on one or more memory devices and executed by one or more processing devices. The TAF 1702 may be implemented as an application programming interface (API) hosted by a computing device. The TAF 1702 may be communicatively coupled between a computer-implemented system 1704 and a third-party computer-implemented system 1706. The computer-implemented system 1704 may be implemented in computer instructions stored on one or more memory devices and executed by one or more processing devices. The computer-implemented system 1704 may use a self-describing data system including numerous items as described herein.

The third-party computer-implemented system 1706 may be implemented in computer instructions stored on one or more memory devices and executed by one or more processing devices. The third-party computer-implemented system 1706 configured to test and/or validate web applications across different browsers and platforms. The third-party computer-implemented system 1706 may be an open source tool used to automate user interface browser testing. The third-party computer-implemented system 1706 may be hosted on a computing device 1708, which may be a server, a desktop, a laptop, a tablet, a router, etc. The computing device 1708 may include one or more processing devices, memory devices, and/or network interfaces. The computing device 1708 may be communicatively coupled to a network 1710. The network 1710 may be a wireless network, such as wide area network (e.g., WAN, the Internet, etc.), a local area network (LAN), a mesh network, and/or a wired network (e.g., Ethernet). The third-party computer-implemented system 1706 may be an application programming interface (API) hosted by the computing device 1708.

The computing device 1708 may also execute an application 1711, which may be implemented in computer instructions stored on one or more memory devices and executed by one or more processing devices. The application 1711 may be a web browser configured to enable visiting websites and retrieving and sending information from and to the websites. The web browser may load a user interface associated with the computer-implemented system 1704. The user interface may be loaded via front end 420, which may include a web client of a web service provided by backend 410. The user interface may present various graphical elements representing items having particular item types (e.g., grid, table, table of contents, navigation panel, etc.) in the self-describing data system.

One or more tests may use one or more libraries 1712 to perform actions on the user interface presented by the front end 420 and/or on functionality of the computer-implemented system 1704. In some embodiments, the libraries 1712 may be compiled by an integrated development environment (IDE) 1714. The IDE 1714 may include a source code editor, a compiler, a debugger, and the like. The libraries 1712 may include dynamic link libraries (DLLs) 1712 that, once compiled, are stored in one or more folders associated with a project for the TAF 1702.

In some embodiments, the TAF 1702, the integrated development environment 1714, the computer-implemented system 1704, etc. may execute on a computing device 1730. The computing device 1730 may include one or more processing devices, memory devices, network interfaces, etc. The computing device 1730 may be a server, a desktop, a laptop, or any suitable computing device.

The TAF 1702 may enable automatically running tests for any version of the computer-implemented system 1702, any version of the third-party computer-implemented system 1706, and/or any version of the application 1711. To enable the agnostic feature, the TAF 1702 may query each of the computer-implemented system 1704, the third-party computer-implemented system 1706, and the application 1711 for latest updates, patches, code, etc. and include the latest updates, patches, code, etc. in one or more libraries 1712. Once updated, the libraries 1712 may be stored in the folder associated with the TAF 1702.

A test 1716 that is written for version one of the computer-implemented system 1704 and version two of the third-party computer-implemented system 1706 may continue to be used when the versions of the computer-implemented system 1704 and/or the third-party computer-implemented system 1706 change. For example, a line of code directed to version one of the computer-implemented system 1704 may be replaced with a corresponding line of code directed to a later version of the computer-implemented system 1704 in the a library 1712. The library 1712, once updated, may be recompiled and used to perform the test via the computer-implemented system 1704 and the third-party computer-implemented system 1706. Similar operations may be performed by the TAF 1702 when the versions of the third-party computer-implemented system 1706 change. The libraries 1712 may include a history of code associated with each version iteration for each of the computer-implemented system 1704, the third-party computer-implemented system 1706, the application 1711, and the like. Accordingly, regardless of which version(s) is involved in a test 1716, the TAF 1702 may be configured to modify one or more libraries 1712 with appropriate code to enable performing the test including the version(s), thereby enabling platform agnostic testing for the architecture 1700.

In some embodiments, the test may be executed via a computing device operated by a developer, tester, or the like. The test may be included in a test suite with one or more other tests. The tests may be associated with one or more types including: user interface testing, application integration testing, and unit testing, among other things. In some embodiments, the computing device 1708 may execute the test 1716, the TAF 1702 may execute the test 1716, or any suitable computing device.

In some embodiments, a user may use one or more templates to develop and generate a test. For example, various items associated with a user interface to be tested may be selected from graphical elements and actions to perform using those items may also be selected. In some embodiments, a test may require routine actions to setup preconditions and/or cleanup when finished. The test may be implemented in a markup language (e.g., XML and/or AML). To add setup or cleanup actions in the test, a user may override or program certain methods (e.g., RunSetUpAmls( ) and RunTearDownAmls( ) of a base class. As previously discussed, the computer-implemented system 1702 may be an object oriented application that uses classes and instances of classes (e.g., objects) and a self-describing data system. The AML may be parameterized as follows:

```
<AML>
    <Item type="User" action"add">
        <default_vault>57473498759</default_vault>
        <login_name>jwoods_S1004</login_name>
        <first_name>{f_name}</first_name>
    </Item>
</AML>
```

The overridden method code may be presented as: protected override void RunSetUpAmls( )

```
{
    var replacementMap =
        new Dictionary<string, string>
        {
            ["{f_name}"] = TestData.Get("Jane")
        };
    SystemActor.AttemptsTo(
        Apply.Aml.FromParameterizedFile("TestSetup.xml"),
            replacementMap));
}
```

In some embodiments, an artificial intelligence engine may train one or more machine learning models to generate a test based on various items that are selected to be tested, to modify tests based on previous results of tests, and the like to optimize a set of tests that are performed on various user interfaces and/or configurations of the computer-implemented system 1704.

In some embodiments the computing system 1730 may include a training engine capable of generating the one or more machine learning models. The machine learning models may be trained to generate a test including actors, abilities, actions, questions, assertions, preconditions, postconditions, setup, teardown, and the like based on input received related to items to be tested and/or a desired result.

The one or more machine learning models may be generated by the training engine and may be implemented in computer instructions executable by one or more processing devices of the training engine and/or the servers. To generate the one or more machine learning models, the training engine may train the one or more machine learning models.

The training engine may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine may be cloud-based, be a real-time software platform, include privacy software or protocols, and/or include security software or protocols.

To generate the one or more machine learning models, the training engine may train the one or more machine learning models. The training engine may use a base data set of test parameters (e.g., actors, actions, abilities, questions, assertions, postconditions, setup, teardown, etc.) and labels corresponding to tests associated with the user interface and/or functionality of the computer-implemented system 1702, the third-party computer-implemented system 1706, and/or the application 1711.

The one or more machine learning models may refer to model artifacts created by the training engine using training data that includes training inputs and corresponding target outputs. The training engine may find patterns in the training data wherein such patterns map the training input to the target output and generate the machine learning models that capture these patterns.

The one or more machine learning models may comprise, e.g., a single level of linear or non-linear operations (e.g., a support vector machine [SVM]) or the machine learning models may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

Figure 18:
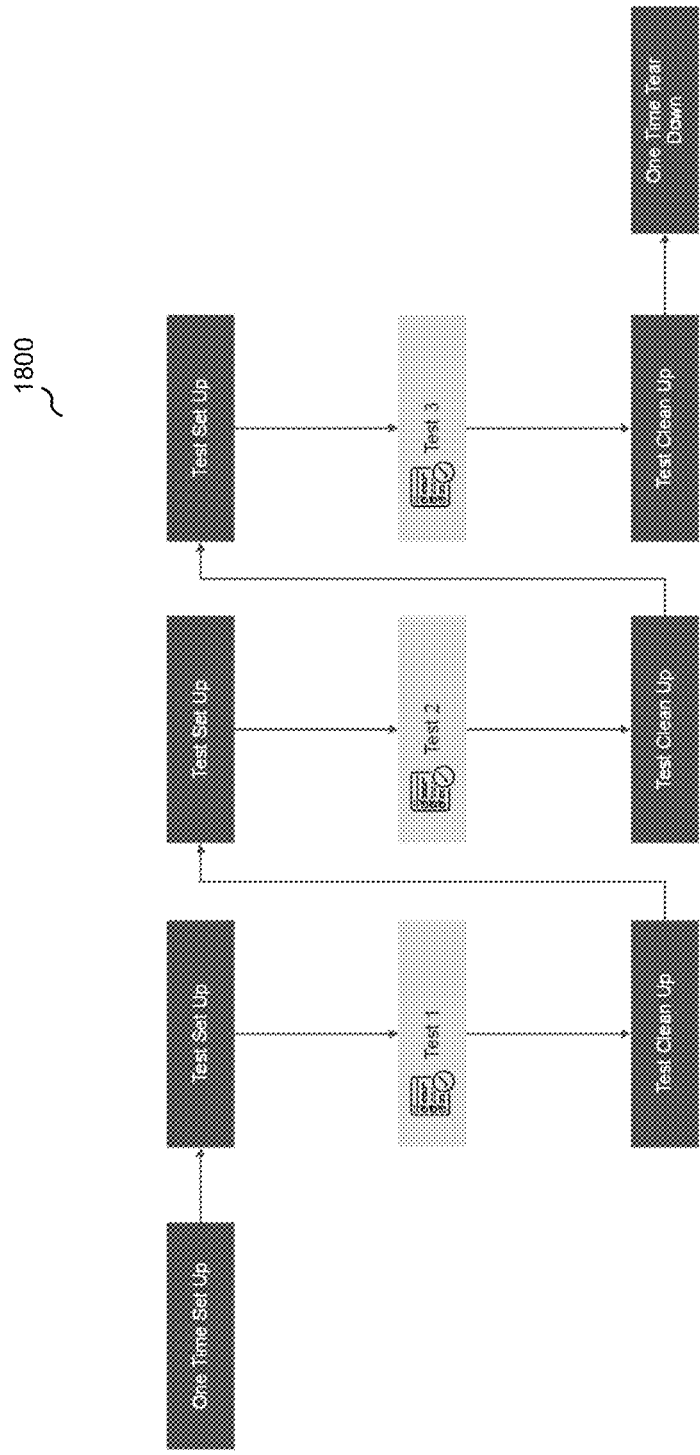
FIG. 18 illustrates an example flow diagram for various tests using the self-describing data model according to embodiments of this disclosure.

FIG. 18 illustrates an example flow diagram 1800 for various tests using the self-describing data model according to embodiments of this disclosure. As depicted, the flow diagram 1800 may include various blocks where operations, functions, programs, methods (e.g., object oriented programming), and the like are performed. The blocks may be included in a base test template that is configurable by the user using a computing device. Initially, the blocks may include a one time set up block that configures test settings, preconditions, services, and the like. After the one time set up block has executed, the base test may include a test set up block for test 1. The test set up block may configure various actor abilities, API preconditions, user interface preconditions, and test data. After the test set up block completes execution for test 1, test 1 may be executed. Test 1 may involve performing various functions (e.g., sending a request message and receiving a response message) and/or actions on the user interface of the computer-implemented system 1704 (e.g., such as testing graphical user interface elements and/or flow of transition between websites), among other things. After test 1 completes performance, a test clean up block may be executed. The test clean up block may perform various tear down operations associated with test 1, such as garbage collection, API post-conditions, and the like. After the test clean up block completes performance, any suitable number of test set ups and test clean ups for tests may be performed in a sequential manner. After all tests are complete, a one time tear down block may be performed. The one time tear down block may configure one time post-conditions.

Figure 19:
FIG. 19 illustrates functions performed at blocks in a test according to embodiments of this disclosure.

FIG. 19 illustrates functions performed at blocks in a test 1900 according to embodiments of this disclosure. As depicted, the "[x]" next to each function may indicate an ability to turn the function on/off for the whole block. As depicted, a one time set up block may include the following functions of a test associated with the computer-implemented system 1702: initializing test run settings, setting one time preconditions, initializing testing services, and/or initial location service. The set up block may include the following functions of a test associated with the computer-implemented system 1702: initialize actors, initialize reporting, add abilities to actors (add browser ability, add reporting ability, add other ability), set API preconditions (run AMLs, run scripts, run other API preconditions), set UI preconditions (login, set routine UI preconditions), and initialize test data. The test block may include executing the test (e.g., processing the markup language document, script, file, etc.). the teardown block may include the followings functions of a test associated with the computer-implemented system 1702: set UI post-conditions, set API post-conditions, deactivate feature, dispose actor, generate report, and remove custom configuration. The one time teardown block may include the following functions of a test associated with the computer-implemented system 1702: set one time post-conditions.

Figure 20:
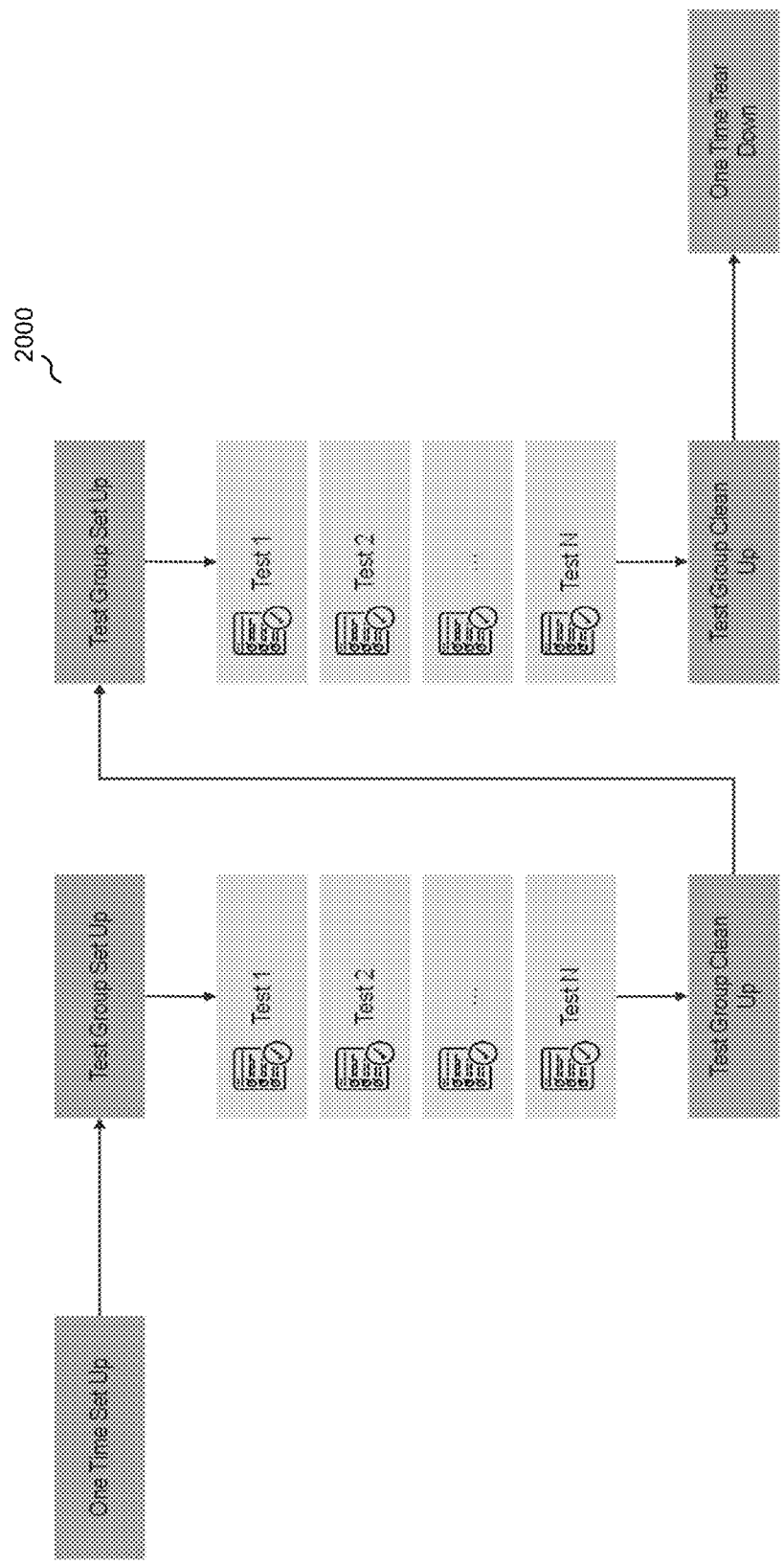
FIG. 20 illustrates an example flow diagram for a set of tests using the self-describing data model according to embodiments of this disclosure.

FIG. 20 illustrates an example flow diagram 2000 for a set of tests using the self-describing data model according to embodiments of this disclosure. The flow diagram 2000 is generally similar to the flow diagram depicted in FIG. 18; however, the flow diagram 2000 includes a test group set up block where functions are performed to set up numerous tests included in a group or suite. For example, as depicted, a test group set up block performs functions (e.g., initialize actors, initialize reporting, add abilities to actors, set API preconditions, set UI preconditions, etc.) associated with test 1, test 2, . . . test n. Then, a test group clean up block is performed for all of the tests that were run in the group. The flow diagram 2000 may continue to perform tests in a similar manner for other groups of tests until all groups of tests have been performed.

Figure 21:
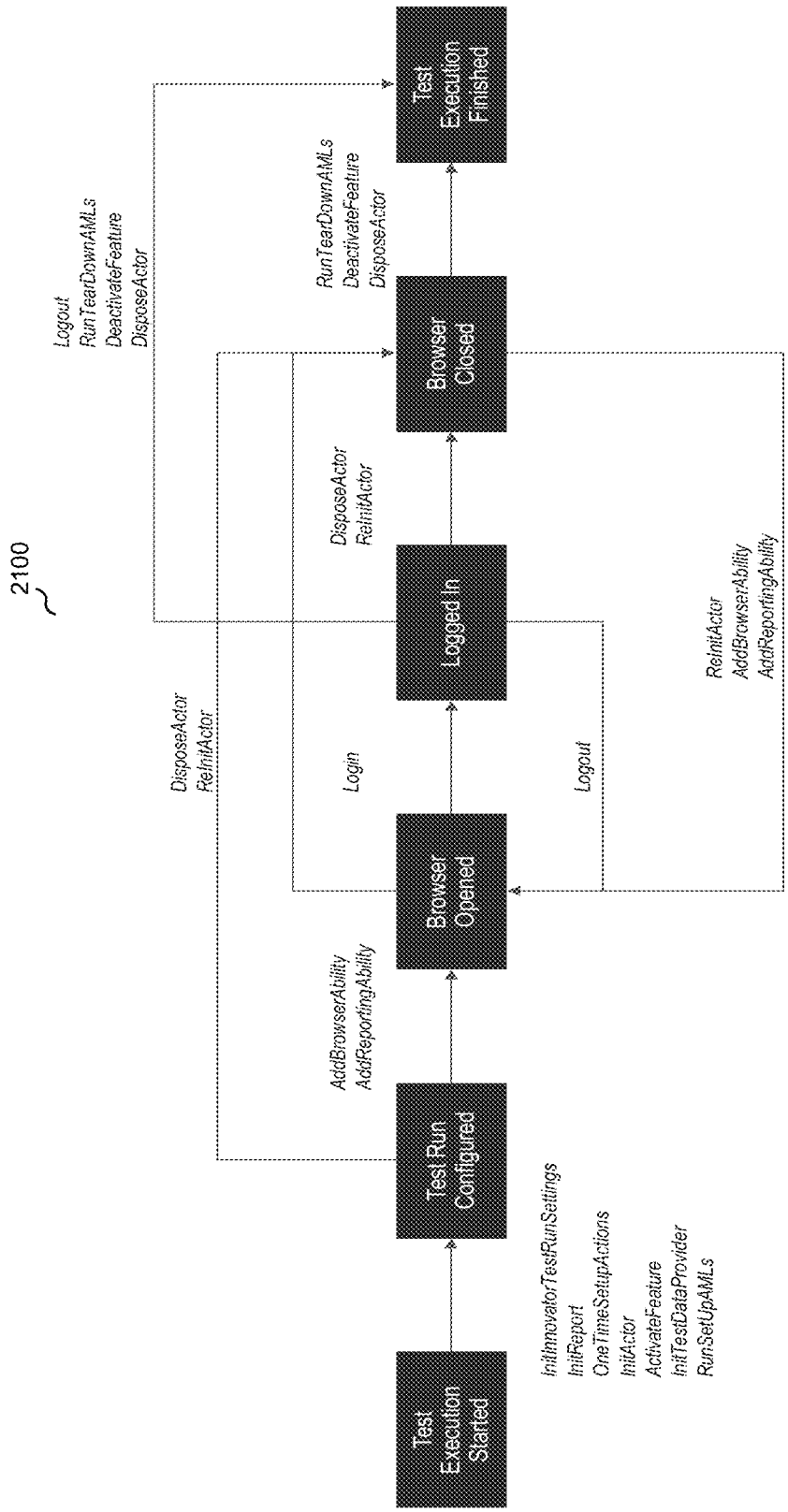
FIG. 21 illustrates a states diagram for performing a test according to embodiments of this disclosure.

FIG. 21 illustrates a state diagram 2100 for performing a test according to embodiments of this disclosure. The state diagram 2100 may initialize when a test is selected to be performed for the computer-implemented system 1702. The state diagram 2100 may begin with a test execution started state, which performs the following functions: initialize test run settings, initialize reporting, perform one time setup actions, initialize actors, active features, initialize test data provider, run setup AMLs. The state transitions to the test run configured state after the test execution started state. The test run configured state may include functions such as adding a browser ability and adding a reporting ability to an actor. The actor may refer to a software application or script configured to perform one or more actions (e.g., via the user interface executing on the browser, or via the computer-implemented system 1702) based on granted abilities.

In one instance, the state transitions from the browser opened state to the browser closed state. In another instance, the state transitions to a browser opened state and the actor logins to enter the logged in state. From the logged in state, the state may transition to the browser closed state after logging out. Also, the state may transition from the logged in state to the test execution finished state after performing the following functions: log out, run teardown AMLs, deactivate feature, dispose actor, etc. Also, the state may transition from the logged in state to the browser closed state after performing the following functions: dispose actor, reinitialize actor, etc.

From the browser closed state, the state may transition back to the browser opened state by performing the following functions: reinitialize actor, add browser ability, add reporting ability, etc. Further, the state may transition from the browser closed state to the test execution finished state by performing the following functions: run teardown AMLs, deactivate feature, dispose actor, etc.

Figure 22:
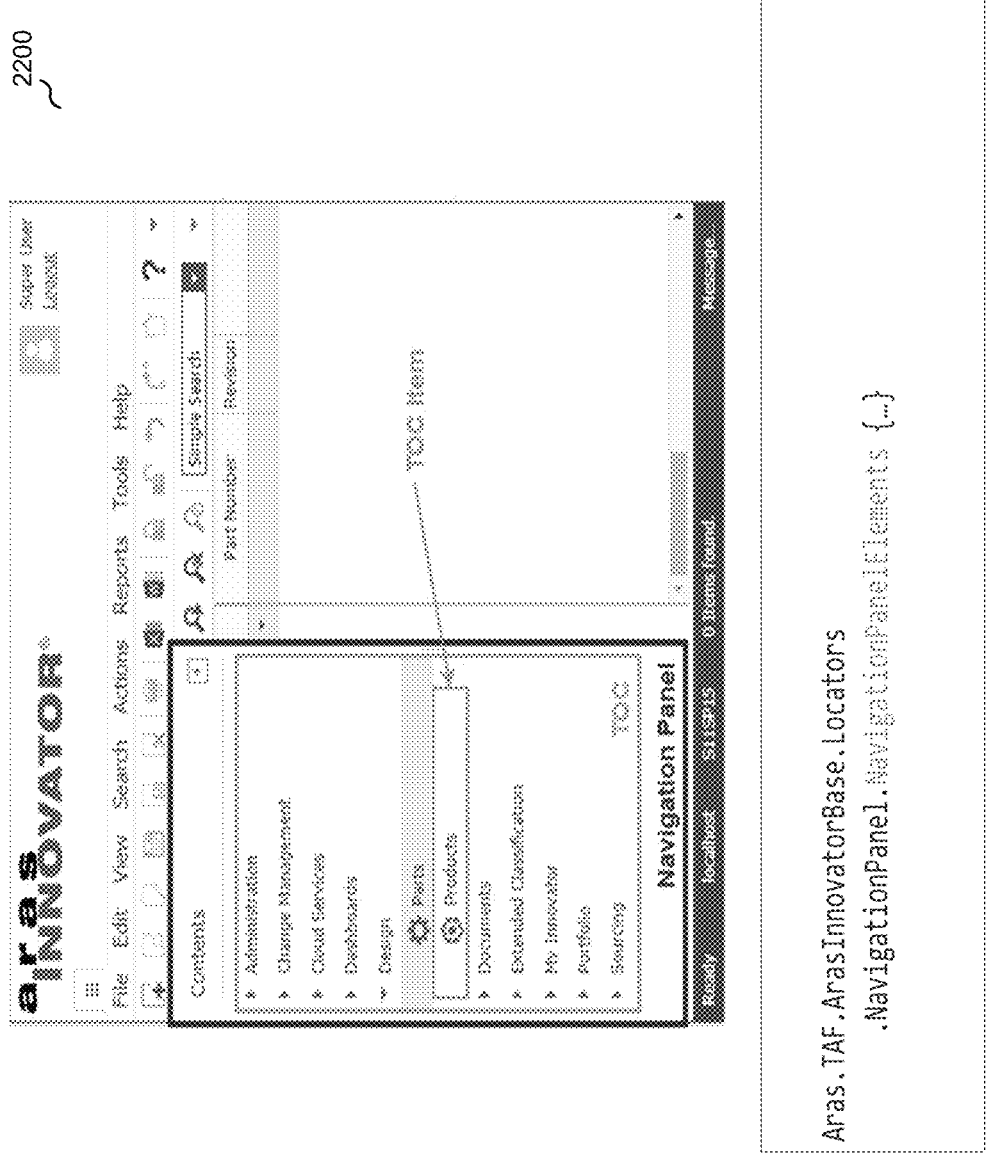
FIG. 22 illustrates a user interface including a navigation panel and table of contents to be tested using the TAF according to embodiments of this disclosure.

FIG. 22 illustrates a user interface 2200 including a navigation panel and table of contents to be tested using the TAF according to embodiments of this disclosure. Code (e.g., C#, Java, C++, etc.) may define targets to be tested in the user interface 2200. For example, "Aras.TAF.ArasInnovatorBase.Locators.NavigationPanel.NavigationPanelElements { . . . }" defines target locations for a navigation panel and a table of contents in the user interface 2200.

FIG. 23 illustrates various actions to be performed by a test associated with the navigation panel and table of contents according to embodiments of this disclosure. As depicted, code defines methods, which allow an actor to select a TOC item by the specified path. An actor may refer to an automated user or software application that performs automated tasks on the user interface 2200. A first method may be defined as "Actor.AttemptsTo(Select.TocItem.ByPath("Administration/ItemType")). This method enables the actor to select a table of content item in the self-describing data system by the specified path "Administration/ItemType". A second method may be defined as "Actor.AttemptsTo(Select.TocItem.ByPath("Administration","ItemType")). This method enables the actor to select a table of content item in the self-describing data system by the specified path "Administration" or "ItemType". A third method may be defined as "Actor.AttemptsTo(Expand.TocItem("Administration/ItemType")). This method enables the actor to attempt to expand a table of time item "Administration/ItemType".

Figure 24:
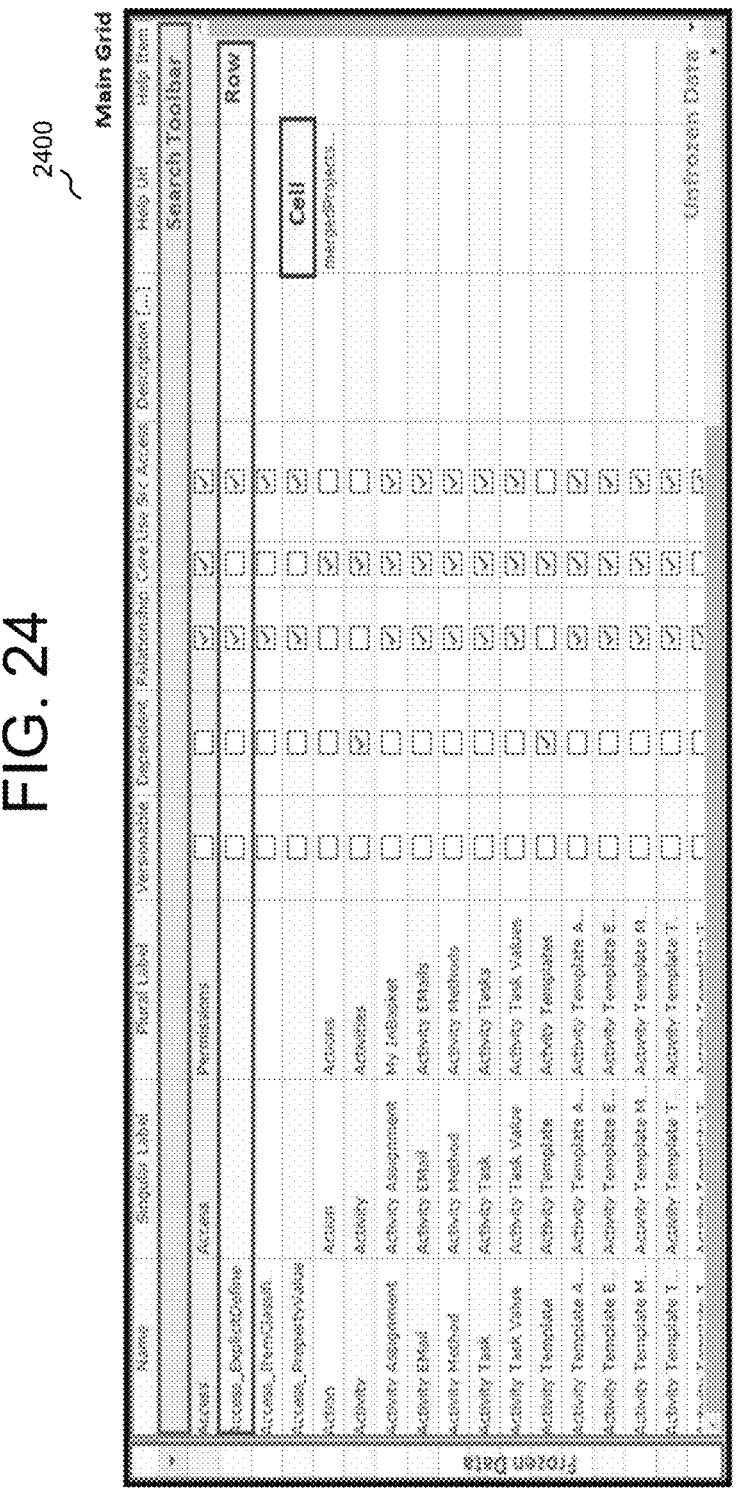
FIG. 24 illustrates a user interface including main grid targets to be tested using the TAF according to embodiments of this disclosure.

FIG. 24 illustrates a user interface 4200 including main grid targets to be tested using the TAF according to embodiments of this disclosure. The grid targets may include a search toolbar, a row, a cell, frozen data, unfrozen data, etc. A test may be written to perform one or more actions on any of the targets in the grid regardless of the version of the computer-implemented system 1702 providing the user interface, the third-party computer-implemented system 1706, and/or the application 1711 on which the user interface 1702 is presented.

As depicted, there are various actions that are common between different versions of the computer-implemented system 1702 (e.g., ARAS Innovator®) that can be identified in a folder of a base project associated with the integrated development environment 1714. The code defines "Aras.TAF.ArasInnovatorBase.Actions.UiActions.MainGridActions { . . . }".

There are also actions specific to specific versions of the computer-implemented system 1702. These specific actions to specific versions may be placed in appropriate projects, such as "Aras.TAF.ArasInnovator11.Actions.UiActions.MainGridActions { . . . }" and "Aras.TAF.ArasInnovator12.Actions.UiActions.MainGridActions { . . . }". Accordingly, actions for version 11 may be placed in its appropriate folder for a project and actions for version 12 may be placed in its appropriate folder for a project. When a request to perform a test is received by the TAF. The TAF may identify which version of the computer-implemented system 1702 is involved in the test and may retrieve the appropriate actions (e.g., the actions for version 11). The code for version 11 actions may be inserted into a library and the library may be recompiled and used by the test such that the test completes successfully. To that end, the test does not need to change in order to work with any version of the computer-implemented system 1702. The same technique may be used to enable agnostic testing ability with any version of the third-party computer-implemented system 1706 and/or the application 1711.

FIG. 25 illustrates various actions 2500 to be performed by a test associated with the grid according to embodiments of this disclosure. The actions may include "Actor.ChecksThat(MainGridState.VisibleRowsCount, Is.GreaterThan (2))", which may confirm that a number of rows in the grid is greater than 2. The actions may include "Actor.ChecksThat(MainGridState.CellValue(1, 1), Is.EqualTo(expectedValue))", which may check that a value in the first cell of the first row is equal to some value. The actions may include "Actor.AskFor(MainGridState.ColumnData("Column Label"))", which may retrieve a lsit of values from specified columns of the grid. The actions may include code to retrieve a "favorite" toggle button on the main grid title bar and to select it. The actions may include code to retrieve an index for some specific column in the main grid. Any suitable action may be programmed in code and may be used to test any version of the computer-implemented system 1702 using the disclosed techniques.

Figure 26:
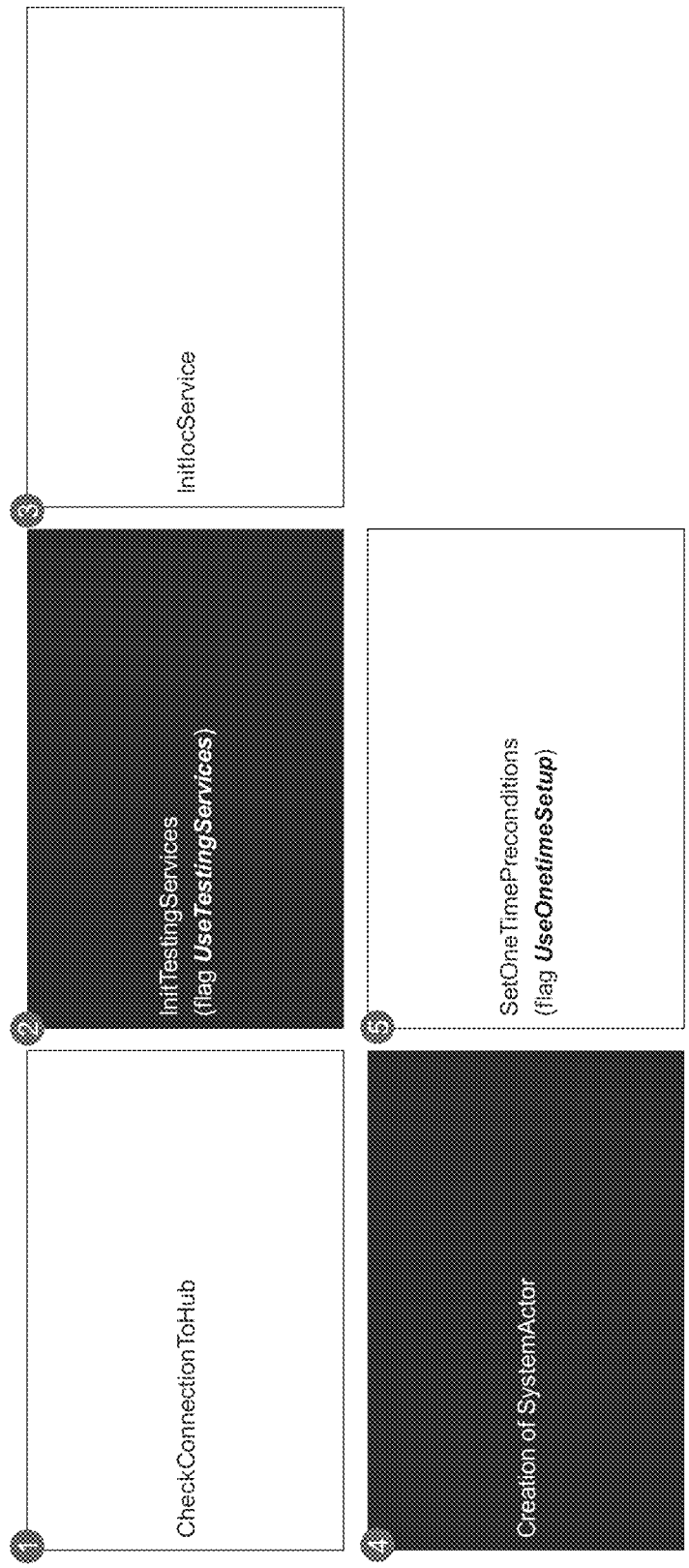
FIG. 26 illustrates a one-time setup for a test according to embodiments of this disclosure.

FIG. 26 illustrates a one-time setup for a test according to embodiments of this disclosure. The figure includes various base web user interface test blocks. At a first step, a processing device may check a connection to hub by sending a get request to a hub with an interval (e.g., 1 second) and a timeout (e.g., 2 minute) for status checking. At a second step, a processing device may initialize testing services by setting default settings for a collection connections (for creation root and administration connection to the computer-implemented system 1720) and creates one or more server log methods. At a third step, a processing device may initialize location services by loading one or more modules to rebind targets, actions, and/or questions. At a fourth step, the processing device may create a system actor, which may be used for reporting, checking server logs, creating main actor in test, disposing actor, reporting browser version, and the like. At a fifth step, the processing device may set one time preconditions by initializing actor and adding abilities to the actor.

Figure 27:
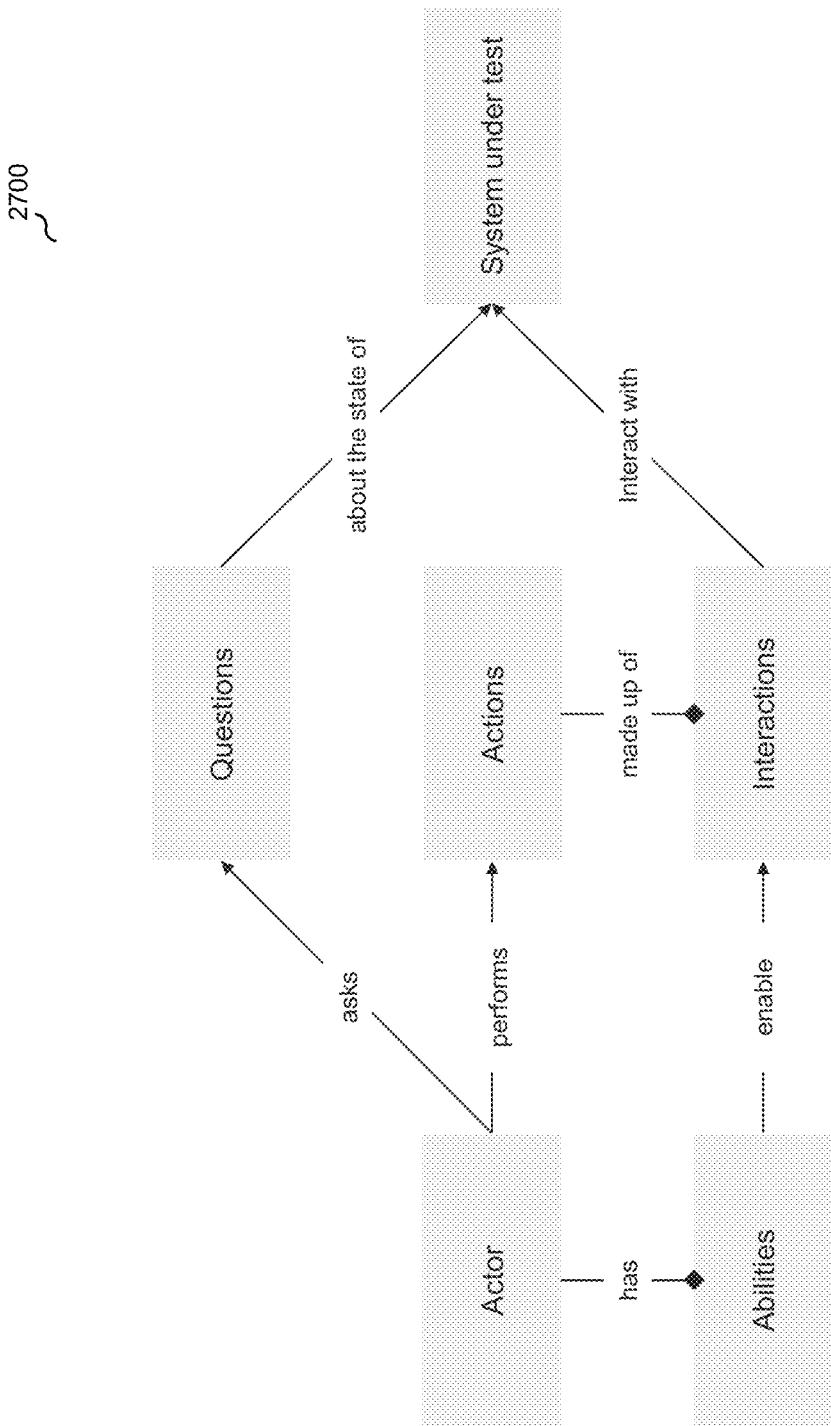
FIG. 27 illustrates a flow diagram of a screenplay pattern according to embodiments of this disclosure.

FIG. 27 illustrates a flow diagram 2700 of a screenplay pattern according to embodiments of this disclosure. As depicted, the flow diagram 2700 includes blocks for actor, actions, questions, abilities, interactions, and system under test. The system under test may refer to a version of the computer-implemented system 1702. It should be noted that the blocks of the screenplay pattern may be modeled and coded in a test using a markup language (e.g., AML). The actor may ask questions (e.g., "is title of a page equal to an expected value?") about the state of the system under test. The actor may perform an action (e.g., select a graphical element representing an item, open a table of contents, etc.) which is made up of one or more interactions that interact with the system under test. The actor may have one or more abilities that enable the interactions. For example, the actor may have the ability to access the browser and manipulate the user interface.

Figure 28:
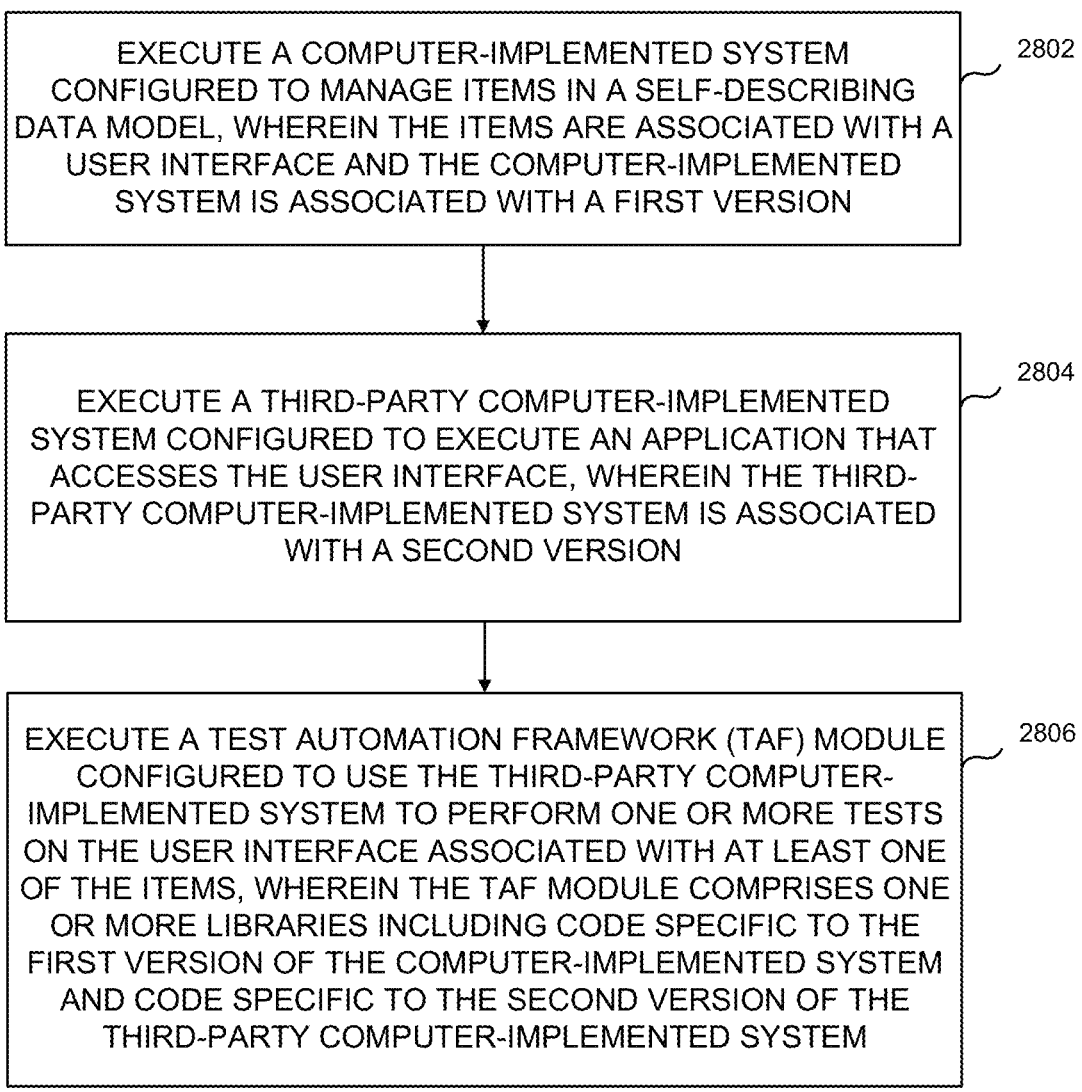
FIG. 28 illustrates an example method for executing a TAF module according to embodiments of this disclosure.

FIG. 28 illustrates an example method 2800 for executing a TAF module according to embodiments of this disclosure. The method 2800 is performed by processing logic that may include hardware (circuitry, dedicated logic, etc.), software (such as is run on a general purpose computer system or a dedicated machine), or a combination of both. The method 2800 and/or each of their individual functions, routines, subroutines, or operations may be performed by one or more processors of a computing device (e.g., any component of FIG. 4 or FIG. 17). In certain implementations, the method 2800 may be performed by a single processing thread. Alternatively, the method 2800 may be performed by two or more processing threads, each thread implementing one or more individual functions, routines, subroutines, or operations of the methods.

For simplicity of explanation, the method 2800 is depicted and described as a series of operations. However, operations in accordance with this disclosure can occur in various orders and/or concurrently, and with other operations not presented and described herein. For example, the operations depicted in the method 2800 may occur in combination with any other operation of any other method disclosed herein. Furthermore, not all illustrated operations may be required to implement the method 2800 in accordance with the disclosed subject matter. In addition, those skilled in the art will understand and appreciate that the method 2800 could alternatively be represented as a series of interrelated states via a state diagram or events.

At 2802, the processing device may execute a computer-implemented system configured to manage items in a self-describing data system. The items may be associated with a user interface and the computer-implemented system may be associated with a first version. The computer-implemented system may be associated with numerous versions as updates are made over time.

An "item type" may refer to a class and an "item" may refer to an object of the class. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

In some embodiments, one or more services hosted by one or more servers. The terms "front-end client application" and "client application" may be used interchangeably herein. The front-end client application may provide a user interface to enable a user to interact with data stored on the one or more servers. Each client application may be individually tailored to provide user interface elements that are desired by a user of the respective application. The platform may enable an entity to model their business using a self-describing data system. The terms "self-describing data system" and "self-describing data model" may be used interchangeably herein. The platform may be flexible and enable a user or system to create objects and relationships between the objects to define any suitable behavior or workflow for a lifecycle of the entity. For example, the platform may refer to a toolkit that allows programming an enterprise application.

Data in the platform for an entity may be described using item types and items. Metadata may be stored and/or generated that describes the item types and items. A web-based client application that executes in a browser or a standalone client application that executes by itself may provide a user interface that enables transmitting a request (e.g., XML or AML message) for data associated with an entity. The one or more servers may build a hierarchical definition using the metadata that is found for the entity in the self-describing data system. The definition may describe a layout of the user interface for the application. A response (e.g., XML or AML message) may be sent by the server including the definition of the layout, and the user interface may be dynamically rendered by the client application. In some embodiments, a format of the response message may be based on the type of the computing device that made the request. That is, the platform may be client-agnostic in that any suitable type of client may benefit from the disclosed techniques. The client devices may include one or more operating systems, such as Windows®, Android®, MacOS®, iOS®, and the like. The client application that is associated with the platform may include a UI engine that interprets user interface metadata modeling definitions in order to render the client user interface and support the behavior defined by the code associated with the definition.

In some embodiments, each user interface element of a user interface of a client application may be modeled (e.g., creating, editing, moving, deleting, etc.). For example, command bars, command buttons, forms, menus, toolbars, sidebars, shortcuts, content, item windows, sliders, accordions, and the like may be modeled in a self-describing data model using the disclosed techniques. Each user interface element may be an item have a respective item type in the self-describing data system. The disclosed techniques may support content of the user interface, layout of the user interface, and behavior/functionality of the user interface.

At 2804, the processing device may execute a third-party computer-implemented system configured to execute an application that accesses the user interface. The third-party computer-implemented system may be associated with a second version.

In some embodiments, the third-party computer-implemented system may include an application programming interface (API). In some embodiments, the application may include a web browser.

At 2806, the processing device may execute a test automation framework (TAF) module configured to use the third-party computer-implemented system to perform one or more tests on the user interface associated with at least one of the items. In some embodiments, the TAF module may include an application programming interface (API). The TAF module may include one or more libraries including code specific to the first version of the computer-implemented system and code specific to the second version of the third-party computer-implemented system. In some embodiments, the one or more libraries may be stored in a folder of an integrated development environment that implements the TAF module. For example, the integrated development environment may be Microsoft® Visual Studio. The computer-implemented system may include and/or execute the integrated development environment. The integrated development environment may refer to software for building applications that includes developer tools in a graphical user interface.

In some embodiments, the one or more tests may be generated based on a screenplay pattern including an actor, an action, an assertion, an exception, or some combination thereof. In some embodiments, the one or more tests are configured to test functionality of graphical elements represented by the items in the self-describing data system. In some embodiments, the one or more tests are configured to test application-level functionality such as message processing, business logic, decision-making, data transformation, data manipulation, and the like. The application-level functionality may be performed by the computer-implemented system.

In some embodiments, the processing device may receive an update pertaining to the code specific to the first version of the computer-implemented system. In some embodiments, the processing device may recompile at least one library including the code specific to the first version of the computer-implemented system.

In some embodiments, the processing device may receive an update pertaining to the code specific to the second version of the third-party computer-implemented system. In some embodiments, the processing device may recompile at least one library including the code specific to the second version of the third-party computer-implemented system.

In some embodiments, the processing device may execute the TAF module to perform one or more second tests on the computer-implemented system by transmitting a message to the computer-implemented system and receiving a response message from the computer-implemented system. The processing device may determine whether the response message matches a predetermined response. The processing device may, in response to the response message matching the predetermined response, output an indication that the one or more second tests were successful. The processing device may, in response to the response message not matching the predetermined response, output an indication that the one or more second tests failed.

In some embodiments, the processing device may receive a test suite including a set of tests. The test suite may be associated with a particular version of the computer-implemented system, the third-party computer-implemented system, the application, or some combination thereof. In some embodiments, based on the particular version of the computer-implemented system, the third-party computer-implemented system, the application, or some combination thereof, the processing device may configure the one or more libraries to include code specific to the particular version. In some embodiments, the processing device may execute the TAF module to perform the test suite to generate results, and the processing device may output the results.

Figure 29:
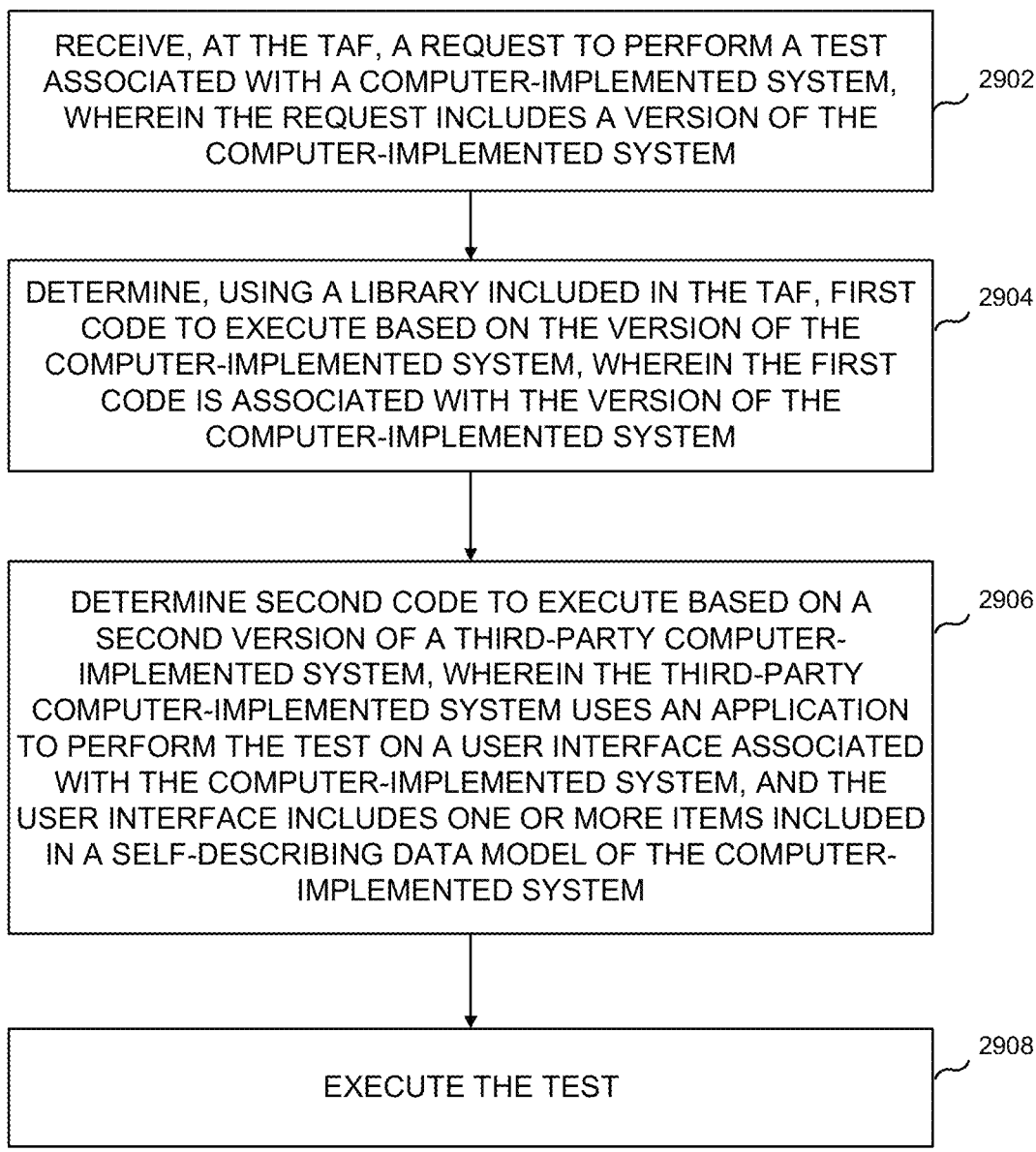
FIG. 29 illustrates an example method for a TAF to identify appropriate code in a library to execute a test according to embodiments of this disclosure.

FIG. 29 illustrates an example method 2900 for a TAF to identify appropriate code in a library to execute a test according to embodiments of this disclosure. The method 2900 is performed by processing logic that may include hardware (circuitry, dedicated logic, etc.), software (such as is run on a general purpose computer system or a dedicated machine), or a combination of both. The method 2900 and/or each of their individual functions, routines, subroutines, or operations may be performed by one or more processors of a computing device (e.g., any component of FIG. 4 or FIG. 17). In certain implementations, the method 2900 may be performed by a single processing thread. Alternatively, the method 2900 may be performed by two or more processing threads, each thread implementing one or more individual functions, routines, subroutines, or operations of the methods.

For simplicity of explanation, the method 2900 is depicted and described as a series of operations. However, operations in accordance with this disclosure can occur in various orders and/or concurrently, and with other operations not presented and described herein. For example, the operations depicted in the method 2900 may occur in combination with any other operation of any other method disclosed herein. Furthermore, not all illustrated operations may be required to implement the method 2900 in accordance with the disclosed subject matter. In addition, those skilled in the art will understand and appreciate that the method 2900 could alternatively be represented as a series of interrelated states via a state diagram or events.

At 2902, the processing device may receive, at the test automation framework (TAF), a request to perform a test associated with a computer-implemented system. In some embodiments, the test may be in the form of a markup language document (for example, an AML, document), JavaScript Object Notation (JSON) document, etc. In some embodiments, the test may be in the form of a script, an executable, a file, or the like. The request may be in the form of a markup language document (for example, an AML or XML document). The request may include a version of the computer-implemented system. In some embodiments, the TAF may include an application programming interface (API) communicatively coupled to the computer-implemented system.

In some embodiments, the test may include one or more actors that perform one or more actions using a document object model (DOM) associated with a computer-implemented system implementing a self-describing data system. In some embodiments, the actions may be performed using one or more items of the self-describing data system. For example, the action may include opening a table of contents user interface element and selecting a link included in the table of contents user interface. As discussed herein, the user may have created the test using a template and there may be a flow of operations implemented by the test, such as test set up, login, manipulate browser, log out, tear down, etc.

At 2904, the processing device may determine, using a library included in the TAF, first code to execute based on the version of the computer-implemented system. The first code may be associated with the version of the computer-implemented system. The library may be in the form of a dynamic link library (DLL) that is compiled by an integrated development environment, such as Microsoft® Visual Studio®. The library may be continually or continuously modified with software updates associated with the computer-implemented system. When the library is updated with new code, modified code, and/or deleted code, the library may be recompiled and stored in a file of the integrated development environment associated with the TAF.

At 2906, the processing device may determine second code to execute based on a second version of a third-party computer-implemented system. In some embodiments, the third-party computer-implemented system may include an application programming interface (API) communicatively coupled to the computer-implemented system. The third-party computer-implemented system may use an application to perform the test on a user interface associated with the computer-implemented system, and the user interface may include one or more items included in a self-describing data system of the computer-implemented system. In some embodiments, the processing device may execute, using the first code and second code, the test. In some embodiments, the application may include a web browser, and the processing device may ping a particular version (e.g., beta) of the web browser for updates on a periodic basis.

In some embodiments, the processing device may receive an update including third code associated with a third version of the computer-implemented system. The processing device may include, in the library, the third code associated with the third version of the computer-implemented system. The processing device may compile the library including the third code to generate a recompiled library. In some embodiments, the processing device may receive a second request to perform a second test. The second request may include an indication of the third version of the computer-implemented system. In some embodiments, the processing device may dynamically determine the third version of the computer-implemented system by analyzing the request (e.g., parameters, strings, attributes, function calls, etc.). In some embodiments, responsive to receiving the second request to perform the second test, the processing device may determine, using the recompiled library, the third code to execute.

In some embodiments, the processing device may update the library with different code pertaining to a set of versions of the computer-implemented system, the third-party computer-implemented system, the application, or the like. In some embodiments, the processing device may reuse the test for the set of versions of the computer-implemented system, the third-party computer-implemented system, the application, or the like.

Figure 30:
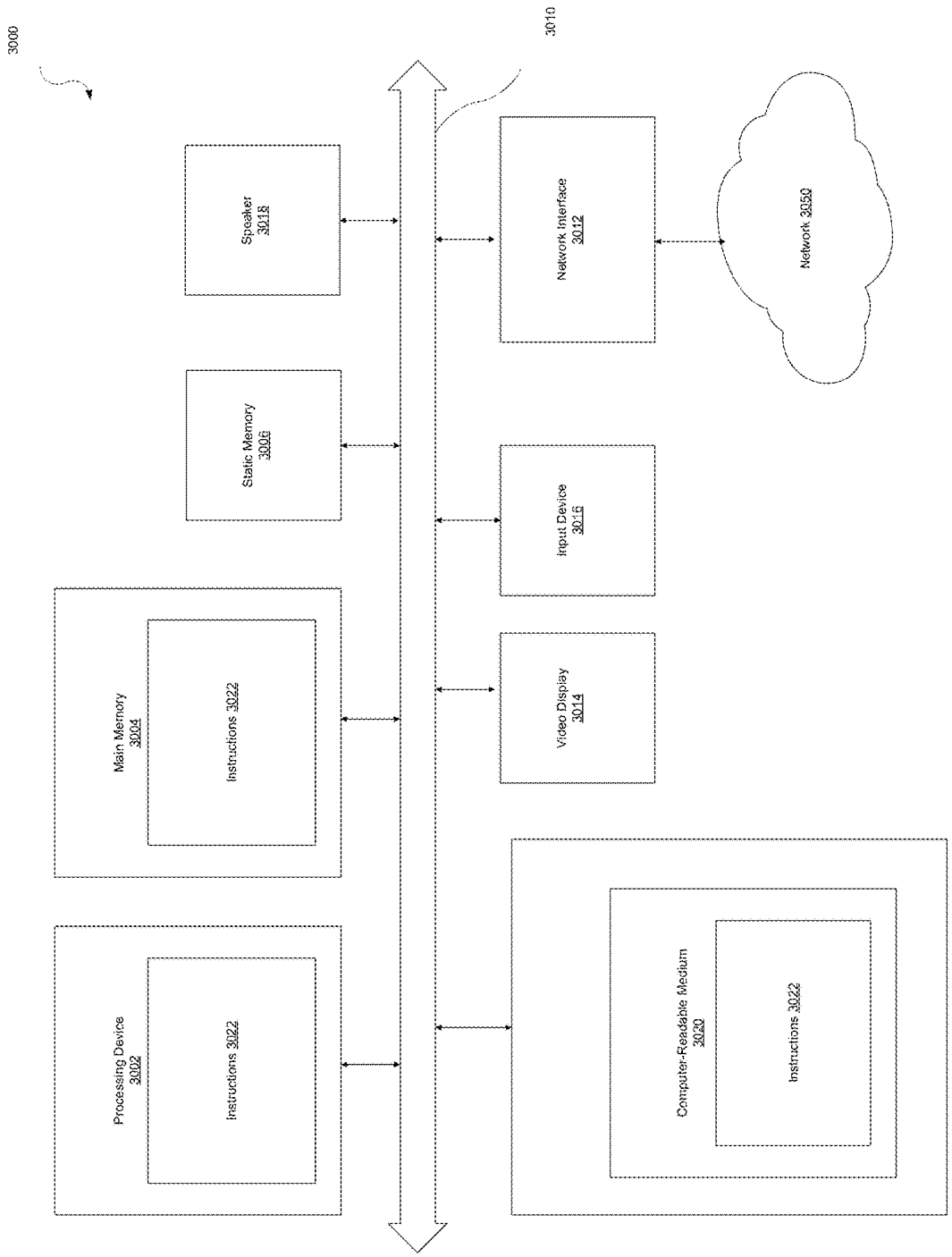
FIG. 30 illustrates an example computer.

FIG. 30 shows an example computer system 3000 which can perform any one or more of the methods described herein, in accordance with one or more aspects of the present disclosure. In one example, computer system 3000 may include a computing device and correspond to the client computing device 1700, the computing device 1704, the third-party computing device 1705, or any other computing device described herein, or any suitable component of FIG. 4 or FIG. 17. The computer system may be connected (e.g., networked) to other computer systems in a LAN, an intranet, an extranet, or the Internet, including via the cloud or a peer-to-peer network. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 3000 includes a processing device 3002, a main memory 3004 (e.g., read-only memory (ROM), flash memory, solid state drives (SSDs), dynamic random access memory (DRAM) such as synchronous DRAM (SDRAM)), a static memory 3006 (e.g., flash memory, solid state drives (SSDs), static random access memory (SRAM)), and a data storage device 3008, which communicate with each other via a bus 3010.

Processing device 3002 represents one or more general-purpose processing devices such as a microprocessor, central processing unit, or the like. More particularly, the processing device 3002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 3002 may also be one or more special-purpose processing devices such as an application specific integrated circuit (ASIC), a system on a chip, a field programmable gate array (FPGA), a digital signal processor (DSP), network processor, or the like. The processing device 3002 is configured to execute instructions for performing any of the operations and steps discussed herein.

The computer system 3000 may further include a network interface device 3012. The computer system 3000 also may include a video display 3014 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 1116 (e.g., a keyboard and/or a mouse or a gaming-like control), and one or more speakers 3018 (e.g., a speaker). In one illustrative example, the video display 3014 and the input device(s) 3016 may be combined into a single component or device (e.g., an LCD touch screen).

The data storage device 3016 may include a computer-readable medium 3020 on which the instructions 3022 embodying any one or more of the methods, operations, or functions described herein is stored. The instructions 3022 may also reside, completely or at least partially, within the main memory 3004 and/or within the processing device 3002 during execution thereof by the computer system 3000. As such, the main memory 3004 and the processing device 3002 also constitute computer-readable media. The instructions 3022 may further be transmitted or received over a network via the network interface device 3012.

While the computer-readable storage medium 3020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Clauses

Clause 1. A computing device comprising:

a memory device storing instructions; and a processing device communicatively coupled to the memory device, wherein the processing device executes the instructions to:

execute a computer-implemented system configured to manage items in a self-describing data system, wherein the items are associated with a user interface and the computer-implemented system is associated with a first version;

execute a third-party computer-implemented system configured to execute an application that accesses the user interface, wherein the third-party computer-implemented system is associated with a second version;

execute a test automation framework (TAF) module configured to use the third-party computer-implemented system to perform one or more tests on the user interface associated with at least one of the items, wherein the TAF module comprises one or more libraries including code specific to the first version of the computer-implemented system and code specific to the second version of the third-party computer-implemented system.

Clause 2. The computing device of claim 1, wherein the processing device is to:

receive an update pertaining to the code specific to the first version of the computer-implemented system; and recompile at least one library including the code specific to the first version of the computer-implemented system.

Clause 3. The computing device of claim 1, wherein the processing device is to:

receive an update pertaining to the code specific to the second version of the third-party computer-implemented system; and recompile at least one library including the code specific to the second version of the third-party computer-implemented system.

Clause 4. The computing device of claim 1, wherein the processing device is to:

execute the TAF module to perform one or more second tests on the computer-implemented system by transmitting a message to the computer-implemented system and receiving a response message from the computer-implemented system;

determining whether the response message matches a predetermined response;

in response to the response message matching the predetermined response, outputting an indication that the one or more second tests were successful; and in response to the response message not matching the predetermined response, outputting an indication that the one or more second tests failed.

Clause 5. The computing device of claim 1, wherein the one or more tests are reusable for different versions of the computer-implemented system, the third-party computer-implemented system, the application, or some combination thereof.

Clause 6. The computing device of claim 1, wherein the processing device is to:

receive a test suite comprising a plurality of tests, wherein the test suite is associated with a particular version of the computer-implemented system, the third-party computer-implemented system, the application, or some combination thereof;

based on the particular version, configure the one or more libraries to include code specific to the particular version;

execute the TAF module to perform the test suite to generate results; and output the results.

Clause 7. The computing device of claim 1, wherein the one or more tests is generated based on a screenplay pattern comprising an actor, an action, an assertion, an exception, or some combination thereof.

Clause 8. The computing device of claim 1, wherein the one or more tests are configured to test functionality of graphical elements represented by the items in the self-describing data system.

Clause 9. The computing device of claim 1, wherein the third-party computer-implemented system comprises an application programming interface, the application comprises a web browser, and the TAF module comprises an application programming interface.

Clause 10. The computing device of claim 1, wherein the computer-implemented system comprises an integrated development environment implementing the TAF module, wherein the one or more libraries are stored in a folder of the integrated development environment.

Clause 11. A method for executing a test automation framework (TAF), wherein the method comprises:

receiving, at the TAF, a request to perform a test associated with a computer-implemented system, wherein the request comprises a version of the computer-implemented system;

determining, using a library included in the TAF, first code to execute based on the version of the computer-implemented system, wherein the first code is associated with the version of the computer-implemented system;

determining second code to execute based on a second version of a third-party computer-implemented system, wherein the third-party computer-implemented system uses an application to perform the test on a user interface associated with the computer-implemented system, and the user interface comprises one or more items included in a self-describing data system of the computer-implemented system; and executing, using the first code and second code, the test.

Clause 12. The method of claim 11, further comprising:

receiving an update comprising third code associated with a third version of the computer-implemented system;

including, in the library, the third code associated with the third version of the computer-implemented system;

compiling the library including the third code to generate a recompiled library;

receiving a second request to perform a second test, wherein the second request comprises the third version; and responsive to receiving the second request to perform the second test, determining, using the recompiled library, the third code to execute.

Clause 13. The method of claim 11, wherein the application comprises a web browser, and the method further comprises pinging the web browser for updates on a periodic basis.

Clause 14. The method of claim 11, further comprising:

updating the library with different code pertaining to a plurality of versions of the computer-implemented system, the third-party computer-implemented system, the application, or the like; and reusing the test for the plurality of versions of the computer-implemented system, the third-party computer-implemented system, the application, or the like.

Clause 15. The method of claim 11, wherein the TAF is an application programming interface communicatively coupled to the computer-implemented system.

Clause 16. The method of claim 11, wherein the third-party computer-implemented system comprises an application programming interface communicatively coupled to the TAF and the application.

Clause 17. A tangible, non-transitory computer-readable medium storing instructions that, when executed, cause a processing device to:

execute a computer-implemented system configured to manage items in a self-describing data system, wherein the items are associated with a user interface and the computer-implemented system is associated with a first version;

execute a third-party computer-implemented system configured to execute an application that accesses the user interface, wherein the third-party computer-implemented system is associated with a second version; and execute a test automation framework (TAF) module configured to use the third-party computer-implemented system to perform one or more tests on the user interface associated with at least one of the items, wherein the TAF module comprises one or more libraries including code specific to the first version of the computer-implemented system and code specific to the second version of the third-party computer-implemented system.

Clause 18. The computer-readable medium of claim 17, wherein the processing device is further to:

execute the TAF module to perform one or more second tests on the computer-implemented system by transmitting a message to the computer-implemented system and receiving a response message from the computer-implemented system;

determining whether the response message matches a predetermined response;

in response to the response message matching the predetermined response, outputting an indication that the one or more second tests were successful; and in response to the response message matching the predetermined response, outputting an indication that the one or more second tests failed.

Clause 19. The computer-readable medium of claim 17, wherein the third-party computer-implemented system comprises an application programming interface, the application comprises a web browser, and the TAF module comprises an application programming interface.

Clause 20. The computer-readable medium of claim 17, wherein the computer-implemented system comprises an integrated development environment implementing the TAF module, wherein the one or more libraries are stored in a folder of the integrated development environment.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computing device comprising:
   a memory device storing instructions; and
   a processing device communicatively coupled to the memory device, wherein the processing device executes the instructions to:
   execute a computer-implemented system configured to manage items in a self-describing data system, wherein the items are associated with a user interface and the computer-implemented system is associated with a first version;
   execute a third-party computer-implemented system configured to execute an application that accesses the user interface, wherein the third-party computer-implemented system is associated with a second version;
   execute a test automation framework (TAF) module configured to use the third-party computer-implemented system to perform one or more tests on the user interface associated with at least one of the items, wherein:
   (i) the TAF module comprises one or more libraries including first code specific to the first version of the computer-implemented system and second code specific to the second version of the third-party computer-implemented system,
   (ii) the first code and the second code are different and enable performing version-agnostic testing between the computer-implemented system and the third-party computer-implemented system, and
   (iii) the TAF module identifies which version of the computer-implemented system and the third-party computer-implemented system is being used, modifies the first code and the second code based on which version is identified by changing a line of code in the first code based on which version of the computer-implemented system is being used and by changing a line of code in the second code based on which version of the third-party computer-implemented system is being used, and performs the one or more tests on the modified first code and the second code without modifying the one or more tests.

2. The computing device of claim 1, wherein the processing device is to:
   receive an update pertaining to the code specific to the first version of the computer-implemented system; and
   recompile at least one library including the code specific to the first version of the computer-implemented system.

3. The computing device of claim 1, wherein the processing device is to:
   receive an update pertaining to the code specific to the second version of the third-party computer-implemented system; and
   recompile at least one library including the code specific to the second version of the third-party computer-implemented system.

4. The computing device of claim 1, wherein the processing device is to:
   execute the TAF module to perform one or more second tests on the computer-implemented system by transmitting a message to the computer-implemented system and receiving a response message from the computer-implemented system;
   determining whether the response message matches a predetermined response;
   in response to the response message matching the predetermined response, outputting an indication that the one or more second tests were successful; and
   in response to the response message not matching the predetermined response, outputting an indication that the one or more second tests failed.

5. The computing device of claim 1, wherein the one or more tests are reusable for different versions of the computer-implemented system, the third-party computer-implemented system, the application, or some combination thereof.

6. The computing device of claim 1, wherein the processing device is to:
receive a test suite comprising a plurality of tests, wherein the test suite is associated with a particular version of the computer-implemented system, the third-party computer-implemented system, the application, or some combination thereof;
based on the particular version, configure the one or more libraries to include code specific to the particular version;
execute the TAF module to perform the test suite to generate results; and
output the results.

7. The computing device of claim 1, wherein the one or more tests is generated based on a screenplay pattern comprising an actor, an action, an assertion, an exception, or some combination thereof.

8. The computing device of claim 1, wherein the one or more tests are configured to test functionality of graphical elements represented by the items in the self-describing data system.

9. The computing device of claim 1, wherein the third-party computer-implemented system comprises an application programming interface, the application comprises a web browser, and the TAF module comprises an application programming interface.

10. The computing device of claim 1, wherein the computer-implemented system comprises an integrated development environment implementing the TAF module, wherein the one or more libraries are stored in a folder of the integrated development environment.

11. A method for executing a test automation framework (TAF), wherein the method comprises:
receiving, at the TAF, a request to perform a test associated with a computer-implemented system, wherein the request comprises a version of the computer-implemented system;
determining, using a library included in the TAF, first code to execute based on the version of the computer-implemented system, wherein the first code is associated with the version of the computer-implemented system;
determining second code to execute based on a second version of a third-party computer-implemented system, wherein the third-party computer-implemented system uses an application to perform the test on a user interface associated with the computer-implemented system, and the user interface comprises one or more items included in a self-describing data system of the computer-implemented system, wherein the first code and the second code are different and enable performing version-agnostic testing between the computer-implemented system and the third-party computer-implemented system; and
executing, using the first code and second code, the test, wherein the TAF identifies which version of the computer-implemented system and the third-party computer-implemented is being used, modifies the first code and the second code based on which version is identified by changing a line of code in the first code based on which version of the computer-implemented system is being used and by changing a line of code in the second code based on which version of the third-party computer-implemented system is being used, and performs the test on the modified first code and the second code without modifying the test.

12. The method of claim 11, further comprising:
receiving an update comprising third code associated with a third version of the computer-implemented system;
including, in the library, the third code associated with the third version of the computer-implemented system;
compiling the library including the third code to generate a recompiled library;
receiving a second request to perform a second test, wherein the second request comprises the third version; and
responsive to receiving the second request to perform the second test, determining, using the recompiled library, the third code to execute.

13. The method of claim 11, wherein the application comprises a web browser, and the method further comprises pinging the web browser for updates on a periodic basis.

14. The method of claim 11, further comprising:
updating the library with different code pertaining to a plurality of versions of the computer-implemented system, the third-party computer-implemented system, the application, or the like; and
reusing the test for the plurality of versions of the computer-implemented system, the third-party computer-implemented system, the application, or the like.

15. The method of claim 11, wherein the TAF is an application programming interface communicatively coupled to the computer-implemented system.

16. The method of claim 11, wherein the third-party computer-implemented system comprises an application programming interface communicatively coupled to the TAF and the application.

17. A tangible, non-transitory computer-readable medium storing instructions that, when executed, cause a processing device to:
execute a computer-implemented system configured to manage items in a self-describing data system, wherein the items are associated with a user interface and the computer-implemented system is associated with a first version;
execute a third-party computer-implemented system configured to execute an application that accesses the user interface, wherein the third-party computer-implemented system is associated with a second version; and
execute a test automation framework (TAF) module configured to use the third-party computer-implemented system to perform one or more tests on the user interface associated with at least one of the items, wherein:
(i) the TAF module comprises one or more libraries including first code specific to the first version of the computer-implemented system and second code specific to the second version of the third-party computer-implemented system,
(ii) the first code and the second code are different and enable performing version-agnostic testing between the computer-implemented system and the third-party computer-implemented system, and
(iii) the TAF module identifies which version of the computer-implemented system and the third-party computer-implemented system is being used, modifies the first code and the second code based on which version is identified by changing a line of code in the first code based on which version of the computer-implemented system is being used and by changing a line of code in the second code based on which version of the third-party computer-implemented system is being used, and performs the one or more tests on the modified first code and the second code without modifying the one or more tests.

18. The computer-readable medium of claim 17, wherein the processing device is further to:
 execute the TAF module to perform one or more second tests on the computer-implemented system by transmitting a message to the computer-implemented system and receiving a response message from the computer-implemented system;
 determining whether the response message matches a predetermined response;
 in response to the response message matching the predetermined response, outputting an indication that the one or more second tests were successful; and
 in response to the response message matching the predetermined response, outputting an indication that the one or more second tests failed.

19. The computer-readable medium of claim 17, wherein the third-party computer-implemented system comprises an application programming interface, the application comprises a web browser, and the TAF module comprises an application programming interface.

20. The computer-readable medium of claim 17, wherein the computer-implemented system comprises an integrated development environment implementing the TAF module, wherein the one or more libraries are stored in a folder of the integrated development environment.

* * * * *